(12) United States Patent
Lee

(10) Patent No.: US 10,649,509 B2
(45) Date of Patent: May 12, 2020

(54) DISPLAY DEVICE CAPABLE OF DETECTING WHETHER A POWER CABLE IS ABNORMALLY CONNECTED

(71) Applicant: SAMSUNG DISPLAY CO., LTD., Yongin-si, Gyeonggi-do (KR)

(72) Inventor: Seung-Jun Lee, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 112 days.

(21) Appl. No.: 15/388,771

(22) Filed: Dec. 22, 2016

(65) Prior Publication Data

US 2017/0322608 A1 Nov. 9, 2017

(30) Foreign Application Priority Data

May 9, 2016 (KR) .................. 10-2016-0056677

(51) Int. Cl.
*G09G 3/00* (2006.01)
*G06F 1/26* (2006.01)
*G09G 3/3233* (2016.01)
*G09G 3/3258* (2016.01)

(52) U.S. Cl.
CPC ............ *G06F 1/26* (2013.01); *G09G 3/006* (2013.01); *G09G 3/3233* (2013.01); *G09G 3/3258* (2013.01); *G09G 2330/02* (2013.01); *G09G 2330/021* (2013.01); *G09G 2330/12* (2013.01)

(58) Field of Classification Search
CPC ............ G09G 3/006; G09G 2330/021; G06F 1/3234; Y02B 70/16
See application file for complete search history.

(56) References Cited

U.S. PATENT DOCUMENTS

| 2007/0182440 | A1* | 8/2007 | Cha ..................... G09G 3/006 324/760.01 |
| 2008/0093924 | A1* | 4/2008 | Matsumoto .......... G01R 31/006 307/10.1 |
| 2009/0109147 | A1* | 4/2009 | Park ..................... G09G 3/20 345/76 |
| 2012/0127213 | A1* | 5/2012 | Park ..................... G09G 3/006 345/690 |

(Continued)

FOREIGN PATENT DOCUMENTS

| KR | 10-2011-0016761 | 2/2011 |
| KR | 10-2012-0028426 | 3/2012 |

(Continued)

OTHER PUBLICATIONS

European Search Report dated August 21, 2017 for European Patent Application No. 17170264.0.

*Primary Examiner* — Yuzhen Shen
(74) *Attorney, Agent, or Firm* — F. Chau & Associates, LLC

(57) ABSTRACT

A display device includes a display panel including a plurality of pixels, first and second source boards connected to the display panel, and a control board. The control board is connected to the first source board via a first power cable and to the second source board via a second power cable. The control board is configured to control a power voltage provided to the pixels based on a first connection signal received from a first ground line of the first power cable and a second connection signal received from a second ground line of the second power cable.

21 Claims, 14 Drawing Sheets

(56) References Cited

U.S. PATENT DOCUMENTS

| | | | |
|---|---|---|---|
| 2013/0335396 A1* | 12/2013 | Kim | G09G 3/3208 345/212 |
| 2014/0240208 A1* | 8/2014 | Kim | G09G 3/3696 345/87 |
| 2014/0354618 A1* | 12/2014 | Shin | G09G 3/3225 345/212 |
| 2015/0187317 A1 | 7/2015 | Seo et al. | |

FOREIGN PATENT DOCUMENTS

| | | |
|---|---|---|
| KR | 10-2014-0039829 | 4/2014 |
| KR | 10-2015-0022295 | 3/2015 |

* cited by examiner

DISPLAY DEVICE CAPABLE OF DETECTING WHETHER A POWER CABLE IS ABNORMALLY CONNECTED

CROSS-REFERENCE TO RELATED APPLICATIONS

This application claims priority under 35 U.S.C. § 119 to Korean Patent Application No. 10-2016-0056677 filed on May 9, 2016, the disclosure of which is incorporated by reference herein in its entirety.

TECHNICAL FIELD

Exemplary embodiments of the inventive concept relate to display devices. More particularly, exemplary embodiments of the inventive concept relate to a display device capable of detecting a connection status of a power cable.

DISCUSSION OF THE RELATED ART

A display device typically includes a display panel having a plurality of pixels. Each pixel receives a power voltage from a power management circuit via a power cable. For example, each pixel of an organic light emitting display device includes an organic light emitting diode (OLED). The OLED includes an organic layer between two electrodes (e.g., an anode and a cathode). Positive holes from the anode are combined with electrons from the cathode in the organic layer between the anode and the cathode to emit light.

A magnitude of a current flowing through the power cable increases as a resolution or a size of the display device increases. The power voltage can be provided to the pixels via a plurality of power cables to reduce a load of the cable. If a part of the power cables that provides the power voltage is abnormally connected (e.g., is in a disconnection status or in a abnormal connection status), a luminance of the display panel may decrease and/or overheating may occur in a panel region adjacent to the power cable that is in the abnormal connection status.

SUMMARY

Exemplary embodiments of the inventive concept provide a display device capable of detecting a connection status of a power cable and controlling a power voltage.

According to exemplary embodiments, a display device may include a display panel including a plurality of pixels, first and second source boards connected to the display panel, and a control board connected to the first source board via a first power cable and connected to the second source board via a second power cable. The control board is configured to control a power voltage provided to the pixels based on a first connection signal received from a first ground line of the first power cable and a second connection signal received from a second ground line of the second power cable.

In exemplary embodiments, the first ground line may receive a ground voltage via the first source board, and the second ground line may receive the ground voltage via the second source board.

In exemplary embodiments, the control board may include a detecting signal generator configured to receive the first connection signal from the first ground line and the second connection signal from the second ground line, and generate a detecting signal based on the first connection signal and the second connection signal. The control board may further include an enable signal generator configured to generate a first enable signal based on the detecting signal, and a power voltage controller configured to control the power voltage based on the first enable signal.

In exemplary embodiments, the detecting signal generator may include a first switching element including a base connected to a first node that receives the first connection signal, an emitter that receives a reference voltage, and a collector connected to a second node to which a first detecting signal is output as the detecting signal. The detecting signal generator may further include a second switching element including a base connected to a third node that receives the second connection signal, an emitter that receives the reference voltage, and a collector connected to a fourth node to which a second detecting signal is output as the detecting signal.

In exemplary embodiments, the detecting signal generator may further include a first pull-up resistor connected between the first node and the reference voltage, a second pull-up resistor connected between the third node and the reference voltage, a first pull-down resistor connected between the second node and a ground voltage, and a second pull-down resistor connected between the fourth node and the ground voltage.

In exemplary embodiments, the enable signal generator may include an AND gate circuit configured to generate the first enable signal by performing a logical AND operation on the first detecting signal, the second detecting signal, and a second enable signal.

In exemplary embodiments, the power voltage controller may include a switching controller configured to generate a selection signal based on the first enable signal, a DC-DC converter configured to generate a plurality of converted voltages based on an input voltage, and a power voltage selector configured to output the power voltage by selecting at least one of the converted voltages based on the selection signal.

In exemplary embodiments, the switching controller may generate the selection signal such that the power voltage is not output when the first enable signal is deactivated.

In exemplary embodiments, the power voltage selector may include a first selector circuit configured to select a first power voltage applied to an anode electrode of an organic light emitting diode (OLED) included in each of the pixels from among the converted voltages based on the selection signal, and a second selector circuit configured to select a second power voltage applied to a cathode electrode of the OLED from among the converted voltages based on the selection signal.

In exemplary embodiments, the switching controller may generate the selection signal such that the second power voltage is greater than the first power voltage when the first enable signal is deactivated.

In exemplary embodiments, the pixels may be driven using simultaneous emission driving, an a single frame may be divided into an emission period and a non-emission period. The switching controller may generate the selection signal such that the first power voltage is greater than the second power voltage during the emission period, and the second power voltage is greater than the first power voltage during the non-emission period when the first enable signal is activated.

In exemplary embodiments, the detecting signal generator may include an OR gate circuit including a first input terminal connected to a first node that receives the first connection signal, a second input terminal connected to a second node that receives the second connection signal, and an output terminal. The detecting signal generator may further include a third switching element including a base connected to a third node that is connected to the output terminal of the OR gate circuit, an emitter that receives a reference voltage, and a collector connected to a fourth node to which the detecting signal is output.

In exemplary embodiments, the detecting signal generator may include a first pull-up resistor connected between the first node and the reference voltage, a second pull-up resistor connected between the second node and the reference voltage, a third pull-up resistor connected between the third node and the reference voltage, and a pull-down resistor connected between the fourth node and a ground voltage.

In exemplary embodiments, the enable signal generator may include an AND gate circuit configured to generate the first enable signal by performing a logical AND operation on the detecting signal and a second enable signal.

In exemplary embodiments, the control board may include a processor configured to receive the first connection signal from the first ground line and the second connection signal from the second ground line, and generate a first enable signal based on the first connection signal and the second connection signal. The control board may further include a power voltage controller configured to control the power voltage based on the first enable signal.

According to exemplary embodiments of the inventive concept, a display device may include a display panel including a plurality of pixels, and a power management circuit configured to provide a power voltage to the pixels via first through (N)th power cables. The first through N(th) power cables may respectively include first through (N)th ground lines, and the power management circuit may be configured to control the power voltage based on first through (N)th connection signals respectively received from the first through (N)th ground lines, where N is an integer greater than 1.

In exemplary embodiments, the power management circuit may include a detecting signal generator configured to generate a detecting signal based on the first through (N)th connection signals, an enable signal generator configured to generate a first enable signal based on the detecting signal, and a power voltage controller configured to control the power voltage based on the first enable signal.

In exemplary embodiments, the detecting signal generator may include first through (N)th switching elements. A (K)th switching element may include a base that receives a (K)th connection signal, an emitter that receives a reference voltage, and a collector to which a (K)th detecting signal is output as the detecting signal, where K is an integer between 1 and N.

In exemplary embodiments, the enable signal generator may include an AND gate circuit configured to generate the first enable signal by performing a logical AND operation on the first through (N)th detecting signals and a second enable signal.

In exemplary embodiments, the detecting signal generator may include an OR gate circuit configured to generate an output signal by performing a logical OR operation on the first through (N)th connection signals, and a detecting signal switching element including a base that receives the output signal of the OR gate circuit, an emitter that receives a reference voltage, and a collector to which the detecting signal is output.

In exemplary embodiments, the enable signal generator may include an AND gate circuit configured to generate the first enable signal by performing a logical AND operation on the detecting signal and a second enable signal.

According to exemplary embodiments of the inventive concept, a display device may include a display panel including a plurality of pixels, first and second source boards connected to the display panel, and a control board. The control board may be connected to the first source board via a first power cable including a first detecting line and a second detecting line, and connected to the second source board via a second power cable including a third detecting line and a fourth detecting line. A first terminal of the second detecting line may be connected to a first terminal of the first detecting line via the first source board. A first terminal of the third detecting line may be connected to a second terminal of the second detecting line via the control board. A first terminal of the fourth detecting line may be connected to a second terminal of the third detecting line via the second source board. The control board may include a processor configured to provide a detecting signal to a second terminal of the first detecting line, an enable signal generator configured to receive a feedback signal from a second terminal of the fourth detecting line and to generate a first enable signal based on the feedback signal, and a power voltage controller configured to control a power voltage based on the first enable signal.

According to exemplary embodiments of the inventive concept, a display device includes a display panel including a plurality of pixels, a first source board and a second source board connected to the display panel, and a control board. The control board may be connected to the first source board via a first power cable and a second power cable, and connected to the second source board via a third power cable and a fourth power cable. The control board may be configured to control a power voltage provided to the pixels based on a first connection signal received from a first ground line of the first power cable, a second connection signal received from a second ground line of the second power cable, a third connection signal received from a third ground line of the third power cable, and a fourth connection signal received from a fourth ground line of the fourth power cable.

In exemplary embodiments, the first and second ground lines may receive a ground voltage via the first source board, and the third and fourth ground lines may receive the ground voltage via the second source board.

In exemplary embodiments, the control board may include a detecting signal generator, an enable signal generator, and a power voltage controller. The detecting signal generator may be configured to receive the first connection signal from the first ground line, the second connection signal from the second ground line, the third connection signal from the third ground line, and the fourth connection signal from the fourth ground line, and generate a detecting signal based on the first through fourth connection signals. The enable signal generator may be configured to generate a first enable signal based on the detecting signal. The power voltage controller may be configured to control the power voltage based on the first enable signal.

A display device according to exemplary embodiments of the inventive concept may efficiently detect an abnormal connection of power cables for providing the power voltage to pixels using connection signals received from ground lines of the power cables or a feedback signal received from a detecting line of the power cable. In addition, the display device may prevent or reduce overheating and/or luminance degradation of the display panel by controlling the power voltage when the power cable is abnormally connected.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Figure 1:
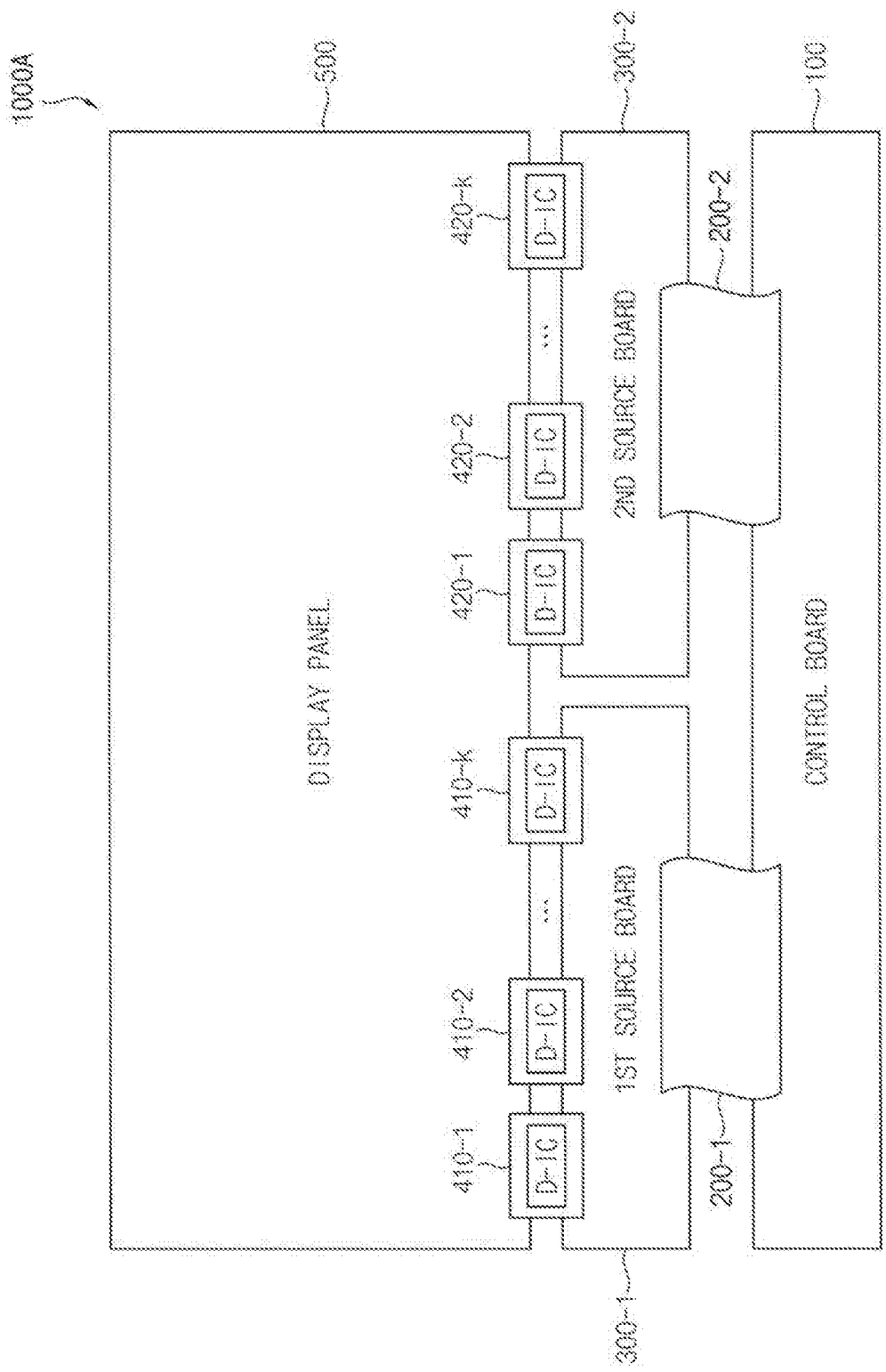
FIG. 1 is a block diagram illustrating a display device according to an exemplary embodiment of the inventive concept.

Exemplary embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

FIG. 1 is a block diagram illustrating a display device according to an exemplary embodiment of the inventive concept.

Referring to FIG. 1, in an exemplary embodiment, a display device 1000A may include a control board 100, a first source board 300-1, a second source board 300-2, and a display panel 500.

The control board 100 may be connected to the first source board 300-1 via a first power cable 200-1 and may be connected to the second source board 300-2 via a second power cable 200-2. The control board 100 may be, for example, a printed circuit board (PCB). In an exemplary embodiment, the control board 100 may include a power management circuit that provides a power voltage to pixels, and may control the power voltage based on a first connection signal received from a first ground line of the first power cable 200-1 and a second connection signal received from a second ground line of the second power cable 200-2. The first and second power cables 200-1 and 200-2 may include, for example, a plurality of lines that provide the power voltage, a ground voltage, control signals, etc. Thus, the control board 100 may determine whether the first connection signal and the second connection signal correspond to the ground voltage. Based on this determination, it may further be determined whether the first power cable 200-1 and the second power cable 200-2 are in a normal connection status or an abnormal connection status. When at least one of the first power cable 200-1 and the second power cable 200-2 is abnormally connected, the control board 100 may control the power voltage such that the pixel does not emit light. As a result, overheating and/or luminance degradation may be prevented or reduced. In addition, the control board 100 may further include a timing controller that controls a driver integrated circuit (D-IC). Here, the ground voltage may indicate a reference voltage (e.g., 0 V or a voltage other than 0 V) of a ground voltage device.

The first and second source boards 300-1 and 300-2 may be connected to the display panel 500. The first and second source boards 300-1 and 300-2 may be, for example, a printed board assembly (PBA) including various components (e.g., a gamma integrated circuit (IC), a driving memory, etc.) for driving the display panel 500 mounted on the PCB. In an exemplary embodiment, the first and second source boards 300-1 and 300-2 may be connected to the display panel 500 via driving circuit packages 410-1 through 410-k, and 420-1 through 420-k, in which k is an integer greater than or equal to three. In exemplary embodiments, less than three driving circuit packages 410 and 420 may be included. The D-IC may be mounted in various manners including, for example, in a chip on film (COF) manner, a tape carrier package (TCP) manner, etc., between the display panel 500 and one of the first and second source boards 300-1 and 300-2.

The display panel 500 may include a plurality of pixels. In an exemplary embodiment, the display device 1000A may be an organic light emitting display device in which each pixel includes an organic light emitting diode (OLED). Each pixel may receive driving signals (e.g., a scan signal, a data signal, etc.) from the D-IC. Further, the pixels may receive a first power voltage provided to an anode electrode of the OLED, and a second power voltage provided to a cathode electrode of the OLED from the power management circuit of the control board 100.

Figure 2:
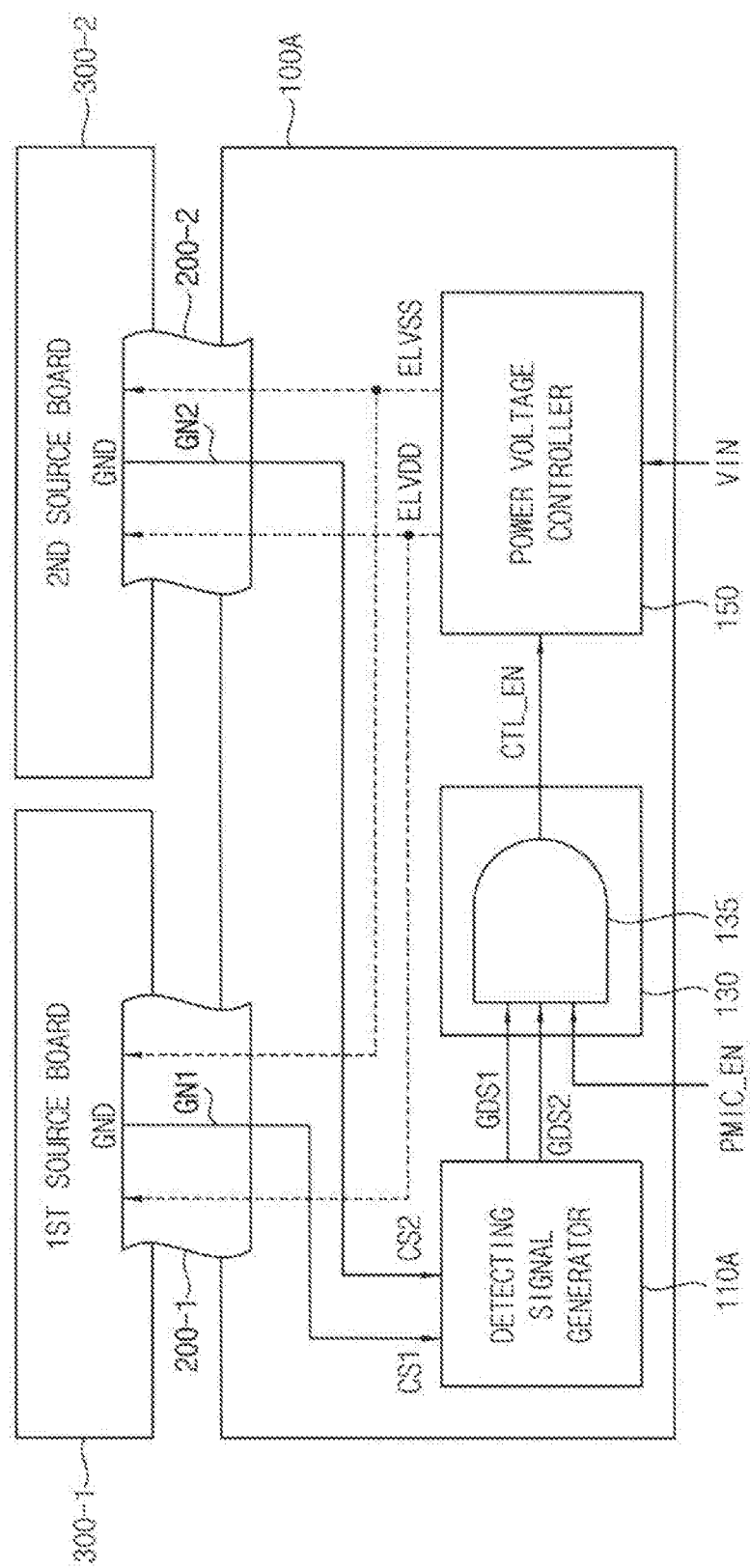
FIG. 2 is a diagram illustrating an example of the source boards and the control board included in the display device of FIG. 1 according to an exemplary embodiment of the inventive concept.

FIG. 2 is a diagram illustrating an example of the source boards and the control board included in the display device of FIG. 1, according to an exemplary embodiment of the inventive concept.

Referring to FIG. 2, the control board 100A may determine connection statuses of the first power cable 200-1 and the second power cable 200-2 based on a first connection signal CS1 received from a first ground line GN1 of the first power cable 200-1 and a second connection signal CS2 received from a second ground line GN2 of the second power cable 200-2, respectively, and may control the power voltage based on the connection status. The control board 100A may include, for example, a detecting signal generator 110A (also referred to as a detecting signal generator circuit 110A), an enable signal generator 130 (also referred to as an enable signal generator circuit 130), and a power voltage controller 150 (also referred to as a power voltage controller circuit 150).

The detecting signal generator 110A may receive the first connection signal CS1 from the first ground line GN1 and the second connection signal CS2 from the second ground line GN2. The first ground line GN1 may receive a ground voltage via the first source board 300-1. The second ground line GN2 may receive the ground voltage via the second source board 300-2. For example, the ground voltage device may apply the ground voltage to the first ground line GN1 via the first source board 300-1 and may apply the ground voltage to the second ground line GN2 via the second source board 300-2. Here, the ground voltage indicates a predetermined reference voltage (e.g., 0 V) of the ground voltage device.

Therefore, when the first power cable 200-1 is normally connected between the control board 100A and the first source board 300-1, the first connection signal CS1 may correspond to the ground voltage. Similarly, when the second power cable 200-2 is normally connected between the control board 100A and the second source board 300-2, the second connection signal CS2 may correspond to the ground voltage. The detecting signal generator 110A may generate the first detecting signal GDS1 and the second detecting signal GDS2 based on the first connection signal CS1 and the second connection signal CS2, respectively. For example, when the first connection signal CS1 corresponds to the ground voltage, the first detecting signal GDS1 may be activated. Further, when the second connection signal CS2 corresponds to the ground voltage, the second detecting signal GDS2 may be activated.

The enable signal generator 130 may generate a first enable signal CTL_EN based on the first detecting signal GDS1 and the second detecting signal GDS2. In an exemplary embodiment, the enable signal generator 130 may include an AND gate circuit 135 that performs a logical AND operation on the first detecting signal GDS1, the second detecting signal GDS2, and a second enable signal PMIC_EN to generate the first enable signal CTL_EN. Here, the second enable signal PMIC_EN may be a signal for enabling or disabling a driving operation of the display panel. For example, the second enable signal PMIC_EN may be inactive in a stand-by mode during which the display device does not operate to reduce the power consumption, or in an initialization mode during which the display device is initialized. Alternatively, the second enable signal PMIC_EN may be activated in a driving mode of the display device.

The power voltage controller 150 may receive input voltage VIN, and control a first power voltage ELVDD and a second power voltage ELVSS based on the first enable signal CTL_EN. For example, when the first enable signal CTL_EN is activated, the power voltage controller 150 may control voltage levels of the first power voltage ELVDD and the second power voltage ELVSS such that the pixels are operated (e.g., such that the pixels are disabled enabled). Alternatively, when the first enable signal CTL_EN is deactivated, the power voltage controller 150 may control voltage levels of the first power voltage ELVDD and the second power voltage ELVSS such that the pixels are not operated (e.g., such that the pixels are disabled).

Therefore, the connection statuses of the power cables may be determined using the ground lines of the power cables. As a result, exemplary embodiments of the inventive concept allow for the detection of an abnormal connection using only one pin of each power cable without the need for an additional pin.

Figure 3:
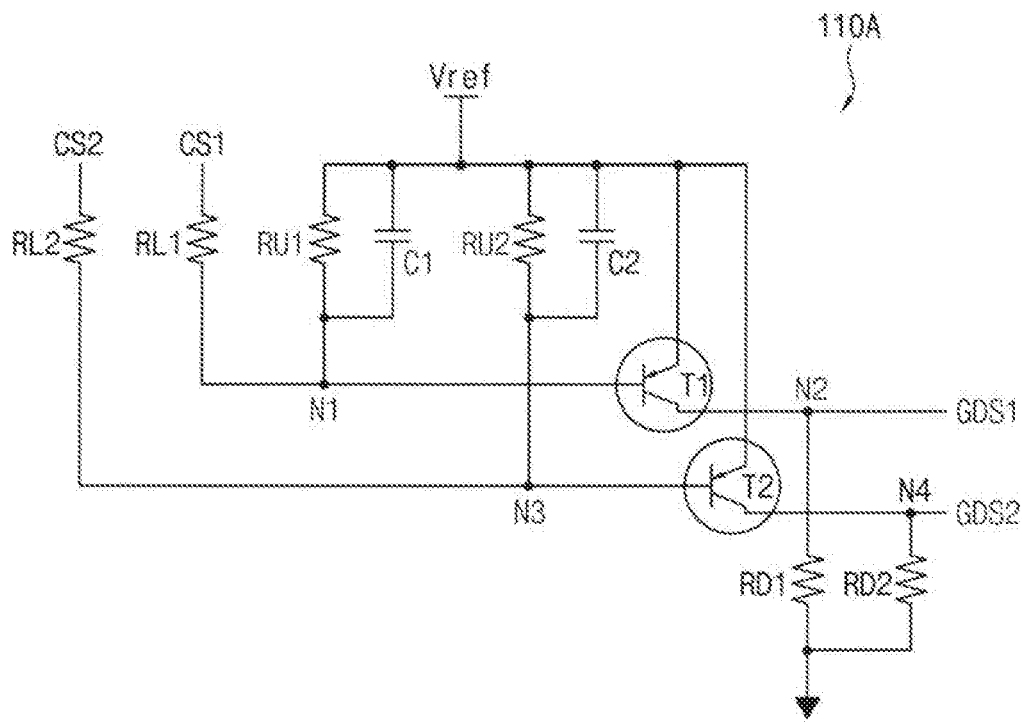
FIG. 3 is a circuit diagram illustrating an example of a detecting signal generator included in the control board of FIG. 2 according to an exemplary embodiment of the inventive concept.

FIG. 3 is a circuit diagram illustrating an example of a detecting signal generator included in the control board of FIG. 2 according to an exemplary embodiment of the inventive concept.

Referring to FIG. 3, the detecting signal generator 110A may include a first switching element T1, a second switching element T2, a first pull-up resistor RU1, a second pull-up resistor RU2, a first pull-down resistor RD1, a second pull-down resistor RD2, a first capacitor C1, and a second capacitor C2. The switching elements may be transistors such as, but not limited to, bipolar junction transistors (BJTs).

The first switching element T1 may include a base connected to a first node N1 that receives the first connection signal CS1, an emitter that receives a reference voltage Vref, and a collector connected to a second node N2 to which a first detecting signal GDS1 is output. The second switching element T2 may include a base connected to a third node N3 that receives the second connection signal CS2, an emitter that receives the reference voltage Vref, and a collector connected to a fourth node N4 to which a second detecting signal GDS2 is output. In an exemplary embodiment, each of the first and second switching elements T1 and T2 may be, for example, a PNP-type bipolar junction transistor (BJT), which may reduce the size and cost of the detecting signal generator 110A. However, exemplary embodiments are not limited thereto.

The first pull-up resistor RU1 may be connected between the first node N1 and the reference voltage Vref. The second pull-up resistor RU2 may be connected between the third node N3 and the reference voltage Vref. The first capacitor C1 may be connected between the first node N1 and the reference voltage Vref. The second capacitor C2 may be connected between the third node N3 and the reference voltage Vref. When the first power cable is in the abnormal connection status, the first connection signal CS1 may be controlled as a high level by the first pull-up resistor RU1 connected to the reference voltage Vref. Further, when the second power cable is in the abnormal connection status, the second connection signal CS2 may be controlled as the high level by the second pull-up resistor RU2 connected to the reference voltage Vref. The first capacitor C1 and the second capacitor C2 may reduce noise included in the first connection signal CS1 and the second connection signal CS2.

The first pull-down resistor RD1 may be connected between the second node N2 and a ground voltage. The second pull-down resistor RD2 may be connected between the fourth node N4 and the ground voltage. When the first power cable is in the abnormal connection status, the first detection signal GDS1 may be controlled as a low level by the first pull-down resistor RD1 connected to the ground voltage. When the second power cable is in the abnormal connection status, the second detection signal GDS2 may be controlled as the low level by the second pull-down resistor RD2 connected to the ground voltage.

For example, when the first power cable is normally connected between the control board 100 and the first source board 300-1 (e.g., in the normal connection status), the first connection signal CS1 may correspond to the ground voltage, and the first connection signal CS1 having the low level may be applied to the base of the first switching element T1. Accordingly, the collector of the first switching element T1 may output the first detecting signal GDS1 having the high level. Alternatively, when the first power cable is abnormally connected between the control board 100 and the first source board 300-1 (e.g., in the abnormal connection status), the detecting signal generator 110A may receive the first connection signal CS1 that is floating, and then the first connection signal CS1 may be controlled as the high level by the first pull-up resistor RU1 connected to the reference voltage Vref. The first detecting signal GDS1 may be controlled as the low level by the first pull-down resistor RD1 connected to the ground voltage.

Similarly, when the second power cable is normally connected between the control board 100 and the second source board 300-2 (e.g., in the normal connection status), the second connection signal CS2 may correspond to the ground voltage, and the second connection signal CS2 having the low level may be applied to the base of the second switching element T2. Accordingly, the collector of the second switching element T2 may output the second detecting signal GDS2 having the high level. Alternatively, when the second power cable is abnormally connected between the control board 100 and the second source board 300-2 (e.g., in the abnormal connection status), the second connection signal CS2 may be controlled as the high level by the second pull-up resistor RU2 connected to the reference voltage Vref, and the second detecting signal GDS2 may be controlled as the low level by the second pull-down resistor RD2 connected to the ground voltage.

Therefore, the detecting signal generator 110A may generate the first detecting signal GDS1 and the second detecting signal GDS2, which respectively indicate connection statuses of the first power cable 200-1 and the second power cable 200-2, based on the first connection signal CS1 received from the first ground line and the second connection signal CS2 received from the second ground line.

Although the exemplary embodiments described with reference to FIGS. 2 and 3 describe that the detecting signal generator 110A generates the detecting signals based on two connection signals, exemplary embodiments of the inventive concept are not limited thereto. For example, in exemplary embodiments, the detecting signal generator 110A may generate the detecting signals based on three or more connection signals. For example, in an exemplary embodiment, the detecting signal generator 110A may receive four connection signals from four power cables and may generate four detecting signals. For this operation, the detecting signal generator 110A may further include additional switching elements disposed in parallel with the first and second switching elements T1 and T2. Exemplary embodiments may further receive more than four connection signals from more than four power cables, and may generate more than four detecting signals.

Further, although the exemplary embodiments described with reference to FIGS. 2 and 3 describe that the detecting signal generator 11A receives only one connection signal from one power cable, exemplary embodiments are not limited thereto. For example, in an exemplary embodiment, when the first power cable 200-1 includes 80 pins, the detecting signal generator 110A respectively receives the first connection signal CS1 and the second connection signal CS2 from the first ground line GN1 corresponding to the first pin and the second ground line GN2 corresponding to an 80th pin included in the first power cable having 80 pins, thereby checking the connection status of the first power cable 200-1. Thus, when the detecting signal generator receives connection signals from a plurality of ground lines of a single power cable, the reliability of detecting the connection status may be improved.

Figure 4:
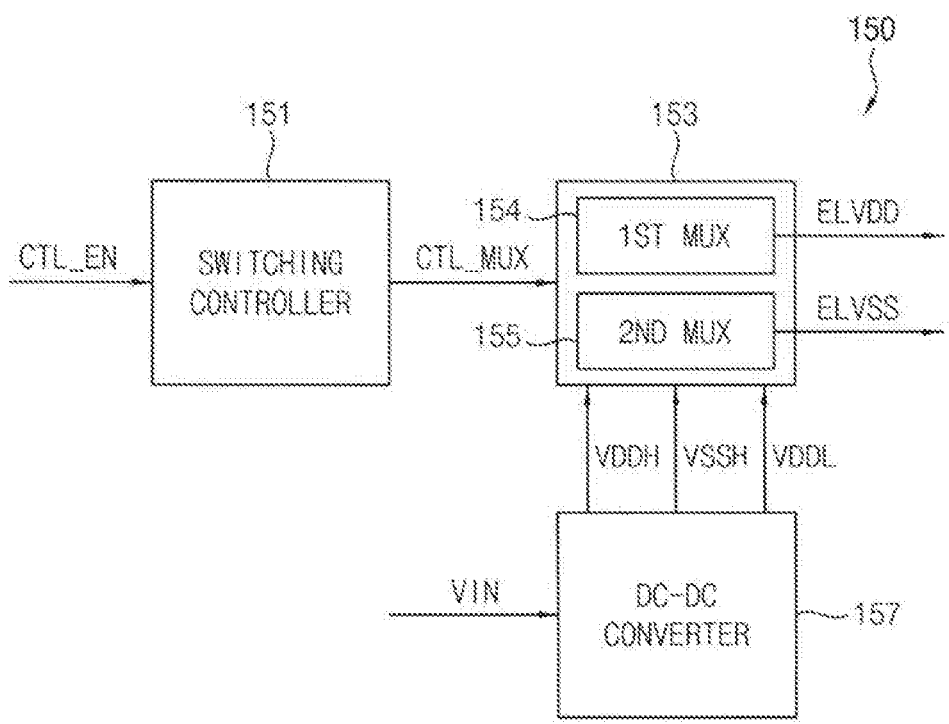
FIG. 4 is a block diagram illustrating an example of the power voltage controller included in the control board of FIG. 2 according to an exemplary embodiment of the inventive concept.
Figure 5A:
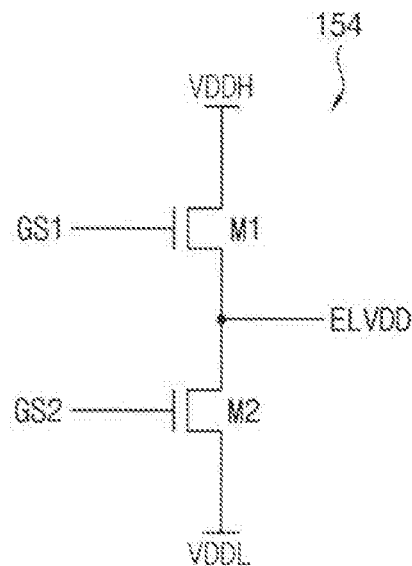
FIGS. 5A and 5B are circuit diagrams illustrating an example of a first selector and a second selector included in the power voltage controller of FIG. 4 according to an exemplary embodiment of the inventive concept.
Figure 5B:
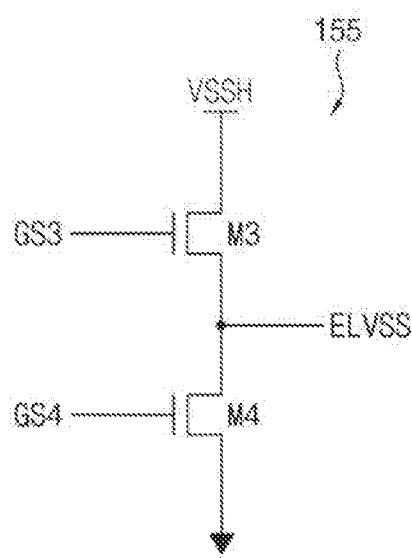

FIG. 4 is a block diagram illustrating an example of the power voltage controller included in the control board of FIG. 2 according to an exemplary embodiment of the inventive concept. FIGS. 5A and 5B are circuit diagrams illustrating an example of a first selector and a second selector included in the power voltage controller of FIG. 4 according to an exemplary embodiment of the inventive concept.

Referring to FIGS. 4, 5A, and 5B, the power voltage controller 150 may include a switching controller 151 (also referred to as a switching controller circuit 151), a power voltage selector 153 (also referred to as a power voltage selector circuit 153), and a DC-DC converter 157 (also referred to as a DC-DC converter circuit 157).

The switching controller 151 may generate a selection signal CTL_MUX based on the first enable signal CTL_EN. The switching controller 151 may generate the selection signal CTL_MUX such that the pixels do not operate when the first enable signal CTL_EN is deactivated (e.g., has the low level). In an exemplary embodiment, the switching controller 151 may generate the selection signal CTL_MUX such that the first and second power voltages ELVDD and ELVSS are not output when the first enable signal CTL_EN is deactivated. In an exemplary embodiment, the switching controller 151 may generate the selection signal CTL_MUX such that the second power voltage ELVSS is greater than the first power voltage ELVSS when the first enable signal CTL_EN is deactivated. In an exemplary embodiment, the switching controller 151 may generate the selection signal CTL_MUX such that the pixels operate when the first enable signal CTL_EN is activated (e.g., has the high level). For example, in the display device driven in a simultaneous emission driving manner in which a single frame is divided into an emission period and a non-emission period, the switching controller 151 may generate the selection signal CTL_MUX such that the first power voltage ELVDD is greater than the second power voltage ELVSS during the emission period, and the second power voltage ELVSS is greater than the first power voltage ELVDD during the non-emission period when the first enable signal is activated. In an exemplary embodiment, the switching controller 151 may receive driving data (e.g., timing data used for simultaneous emission driving) and may generate the selection signal CTL_MUX based on the driving data.

The power voltage selector 153 may select the converted voltages VDDH, VSSH, and VDDL based on the selection signal CTL_MUX to output the first power voltage ELVDD and the second power voltage ELVSS. In an exemplary embodiment, the power voltage selector 153 may include a first selector 154 (also referred to as a first selector circuit 154) and a second selector 155 (also referred to as a second selector circuit 155), as shown in FIGS. 5A and 5B. The first and second selector circuits 154 and 155 may be, for example, multiplexers.

Referring to FIG. 5A, the first selector 154 may select the first power voltage ELVDD applied to the anode electrode of the OLED included in each pixel from among the converted voltages VDDH, VSSH, and VDDL. In an exemplary embodiment, as shown in FIG. 5A, the first selector 154 may receive a first gate signal GS1 and a second gate signal GS2 as the selection signal, and may include a first transistor M1 and a second transistor M2. The first transistor M1 may include a gate electrode receiving the first gate signal GS1, a first electrode receiving the first converted voltage VDDH, and a second electrode connected to an output terminal to which the first power voltage ELVDD is output. The second transistor M2 may include a gate electrode receiving the second gate signal GS2, a first electrode receiving a second converted voltage VDDL, and a second electrode connected to the output terminal to which the first power voltage ELVDD is output.

The second selector 155 may select the second power voltage ELVSS applied to the cathode electrode of the OLED included in each pixel among the converted voltages VDDH, VSSH, and VDDL. In an exemplary embodiment, as shown in FIG. 5B, the second selector 155 may receive a third gate signal GS3 and a fourth gate signal GS4 as the selection signal, and may include a third transistor M3 and a fourth transistor M4. The third transistor M3 may include a gate electrode receiving the third gate signal GS3, a first electrode receiving the third converted voltage VSSH, and a second electrode connected to an output terminal to which the second power voltage ELVSS is output. The fourth transistor M4 may include a gate electrode receiving the fourth gate signal GS4, a first electrode connected to the ground voltage, and a second electrode connected to the output terminal to which the second power voltage ELVSS is output.

The DC-DC converter 157 may generate the converted voltages VDDH, VSSH, VDDL from the input voltage VIN. For example, the DC-DC converter 157 may include a plurality of converters, and the input voltage VIN may be converted into the converted voltages VDDH, VSSH, VDDL by turning the switching transistors included in the converters on or off.

Although the exemplary embodiments of FIGS. 5A and 5B describe that the power voltage selector is implemented as field effect transistor (FET) multiplexers, exemplary embodiments are not limited thereto. For example, in exemplary embodiments, the power voltage selector may be implemented using a variety of structures.

Figure 6:
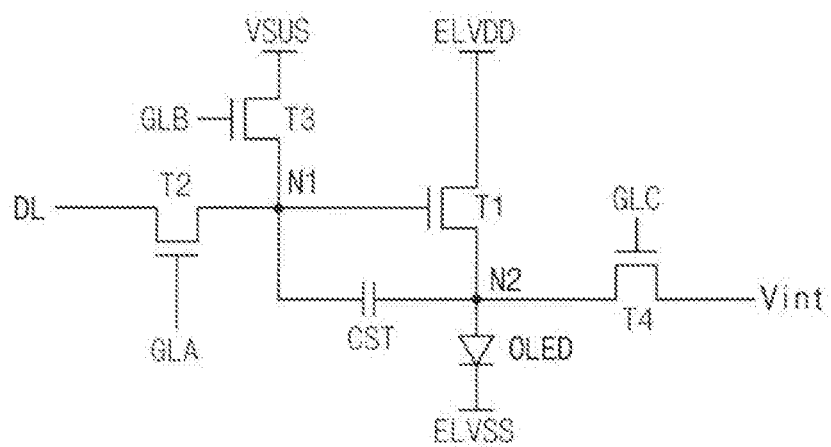
FIG. 6 is a circuit diagram illustrating an example of a pixel included in the display device of FIG. 1 according to an exemplary embodiment of the inventive concept.
Figure 7:
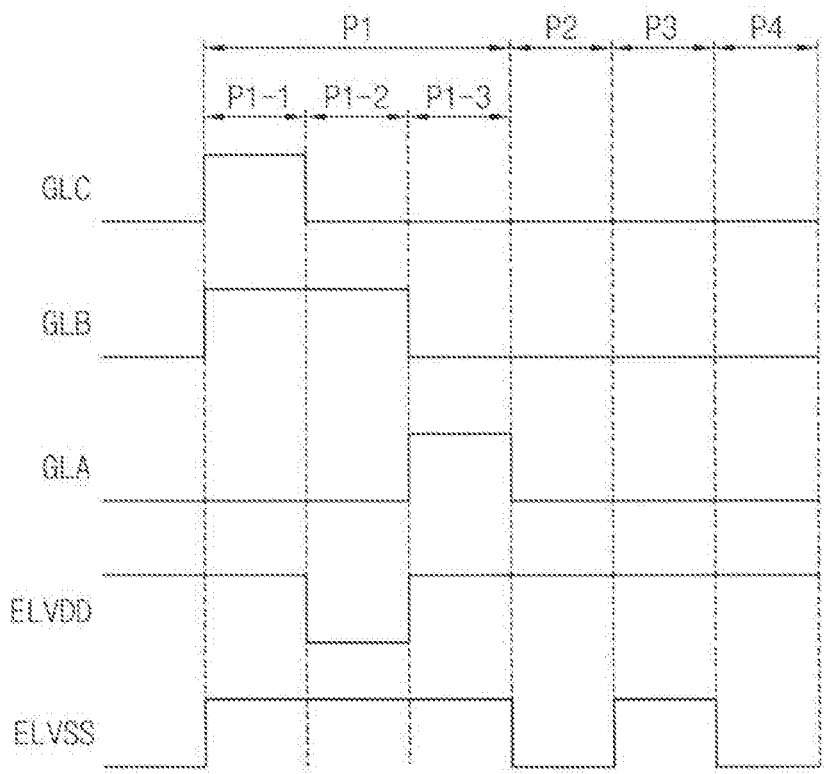
FIG. 7 is a timing diagram illustrating an operation of the pixel of FIG. 6 according to an exemplary embodiment of the inventive concept.

FIG. 6 is a circuit diagram illustrating an example of a pixel included in the display device of FIG. 1 according to an exemplary embodiment of the inventive concept. FIG. 7 is a timing diagram illustrating an operation of the pixel of FIG. 6 according to an exemplary embodiment of the inventive concept.

Referring to FIGS. 6 and 7, the pixels in the display panel may be driven by a simultaneous emission driving manner in which a single frame is divided into an emission period and a non-emission period. Thus, the pixels do not emit light during the non-emission period and simultaneously emit light during the emission-period. Since a relatively high driving current is used to drive the pixels using simultaneous emission driving, the power voltages may be provided via a plurality of power cables to reduce the load of the cables.

As shown in FIG. 6, in an exemplary embodiment, the pixel may include first through fourth transistors T1 through T4, a capacitor CST, and an OLED.

The first transistor T1 may be a driving transistor. The first transistor T1 may include a gate electrode connected to the first node N1, a first electrode connected to the first power voltage ELVDD, and a second electrode connected to a second node N2.

The second transistor T2 may include a gate electrode that receives a scan signal from a scan line GLA, a first electrode that receives a data signal from a data line DL, and a second electrode connected to the first node N1.

The third transistor T3 may include a gate electrode that receives a voltage control signal from a voltage control line GLB, a first electrode connected to a sustaining voltage VSUS, and a second electrode connected to the first node N1.

The fourth transistor T4 may include a gate electrode that receives an initialization control signal from an initialization control line GLC, a first electrode connected to an initialization voltage Vint, and a second electrode connected to the second node N2.

The capacitor CST may include a first electrode connected to the first node N1 and a second electrode connected to the second node N2.

The OLED may include a first electrode (e.g., an anode electrode) connected to the second node N2 and a second electrode (e.g., a cathode electrode) connected to the second power voltage ELVSS.

As shown in FIG. 7, a single frame may include a first non-emission period P1, a first emission period P2, a second non-emission period P3, and a second emission period P4. The first non-emission period P1 may include a reset period P1-1, a compensation period P1-2, and a data writing period P1-3.

During the reset period P1-1, the initialization control signal and voltage control signal may correspond to an on-voltage level, and the scan signal may correspond to an off-voltage level. Accordingly, the third transistor T3 and the fourth transistor T4 may be turned on. The sustaining voltage VSUS may be applied to the first node N1 connected to the gate electrode of the first transistor T1. The initialization voltage Vint may be applied to the second node N2 connected to the second electrode of the first transistor T1. Therefore, the first node N1 and the second node N2 may be reset.

During the compensation period P1-2, the voltage control signal may correspond to the on-voltage level, and the initialization control signal and the scan signal may correspond to the off-voltage level. Further, the first power voltage ELVDD may correspond to the low level. Accordingly, the third transistor T3 may be turned on. The sustaining voltage VSUS may be applied to the first node N1 connected to the gate electrode of the first transistor T1. At this time, a voltage of the second node N2 may be boosted to a voltage derived by subtracting a threshold voltage of the first transistor T1 from a voltage (e.g., the sustaining voltage VSUS) of the gate electrode of the first transistor T1. Therefore, the threshold voltage of the first transistor T1 may be measured because the voltage difference between the gate electrode and the second electrode of the first transistor T1 sets to the threshold voltage of the first transistor T1.

During the data writing period P1-3, the scan signal may correspond to the on-voltage level, and the initialization control signal and the voltage control signal may correspond to the off-voltage level. Accordingly, the second transistor T2 may be turned on. The data signal may be applied to the first node N1.

During the first and second emission periods P2 and P4, the first power voltage ELVDD may correspond to the high level, and the second power voltage ELVSS may correspond to the low level. Accordingly, the driving current may flow through the first transistor T1, and the driving current may be provided to the OLED.

During the second non-emission period P3, the first power voltage ELVDD may correspond to the low level, and the second power voltage ELVSS may correspond to the high level. Accordingly, the driving current may be not provided to the OLED, and the pixels may not emit light.

Therefore, the single frame includes a plurality of non-emission periods P1 and P3 to obtain the effect of increasing a driving frequency and to prevent or reduce flicker. In this case, the high driving current may be used because the emission period (e.g., the first and second emission periods P2 and P4) during which the pixels emit light has a limited time within the single frame. As a result, overheating and/or luminance degradation may occur due to the increased current when a part of the power cables is abnormally connected.

Figure 8A:
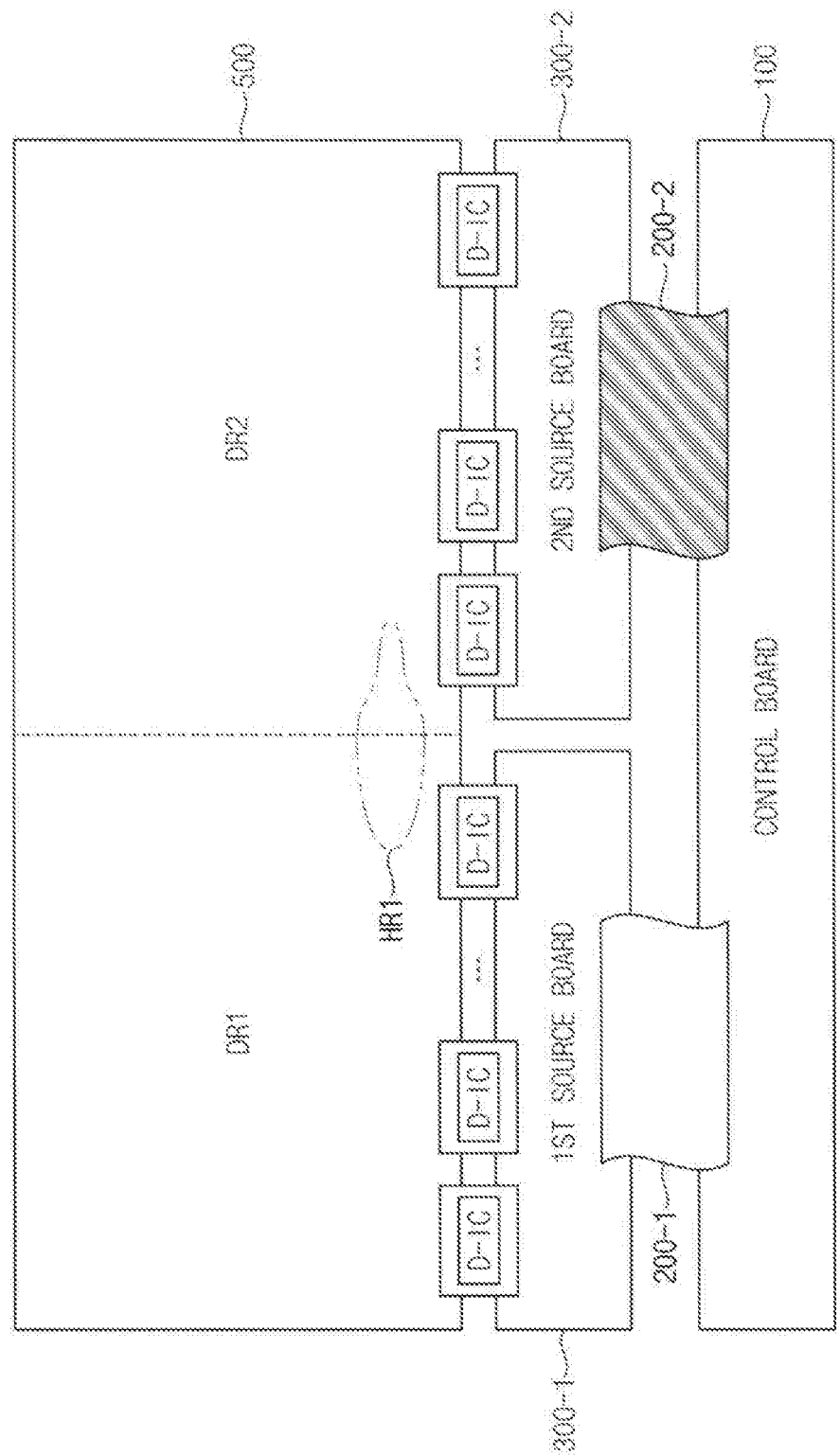
FIGS. 8A and 8B are diagrams illustrating an effect of the display device of FIG. 1 according to an exemplary embodiment of the inventive concept.
Figure 8B:
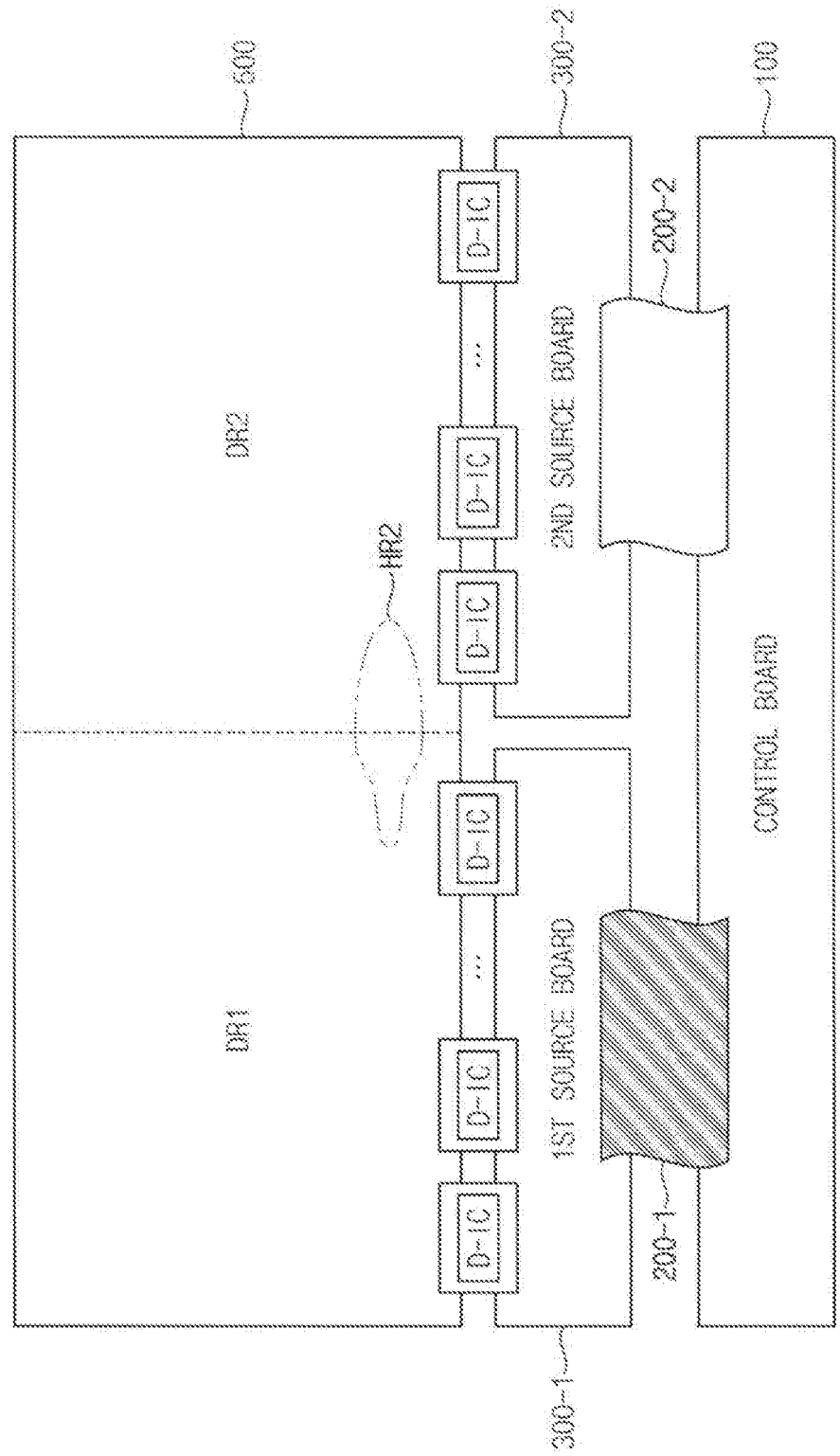

FIGS. 8A and 8B are diagrams illustrating an effect of the display device of FIG. 1 according to an exemplary embodiment of the inventive concept.

Referring to FIGS. 8A and 8B, in an exemplary scenario in which at least one of the first and second power cables 200-1 and 200-2 is disconnected or abnormally connected, luminance degradation and/or overheating may occur in a partial region of the display panel 500 adjacent to the disconnected or abnormally connected power cable.

As shown in FIG. 8A, the power voltage may be provided to the display panel 500 via the first power cable 200-1 and the first source board 300-1 when the second power cable 200-2 is abnormally connected between the second source board 300-2 and the control board 100. In this case, a second display region DR2 of the display panel 500 adjacent to the second source board 300-2 may have a relatively low luminance in comparison to a first display region DR1 of the display panel 500 adjacent to the first source board 300-1 because a magnitude of the voltage drop is relatively large in the second display region DR2. In addition, overheating may occur in a path through which the power voltage is provided to the second display region DR2 via the first source board 300-1 (for example, especially in the first inlet region HR1). In an experimental exemplary scenario, the power voltage was provided to a display panel of a 55 inch organic light emitting display device using two power cables. When the first and second power cables were normally connected, a temperature of the first inlet region HR1 was measured at about 30 degrees Celsius. When the second power cable was abnormally connected, a temperature of the first inlet region HR1 was measured at about 135 degrees Celsius.

As shown in FIG. 8B, the power voltage may be provided to the display panel 500 via the second power cable 200-2 and the second source board 300-2 when the first power cable 200-1 is abnormally connected between the first source board 300-1 and the control board 100. In this case, the luminance of the first display region DR1 may be relatively lower compared to the luminance of the second display region DR2. In addition, overheating may occur in a path through which the power voltage is provided to the first display region DR1 via the second source board 300-2 (for example, especially in the second inlet region HR2).

According to exemplary embodiments of the inventive concept, overheating and/or luminance degradation may be prevented or reduced by detecting a disconnection or abnormal connection of at least one of the power cables, and by controlling the power voltage. Further, according to exemplary embodiments, the display device may efficiently detect the disconnection or incorrect connection of the power cables using connection signals received from the ground lines in the power cables.

Although the exemplary embodiments described with reference to FIGS. 6, 7, 8A, and 8B describe that the display panel is driven in a simultaneous emission driving manner, exemplary embodiments are not limited thereto. For example, in exemplary embodiments, the pixels may be implemented using a variety of structures, and the display panel may be driven in a variety of manners.

Figure 9:
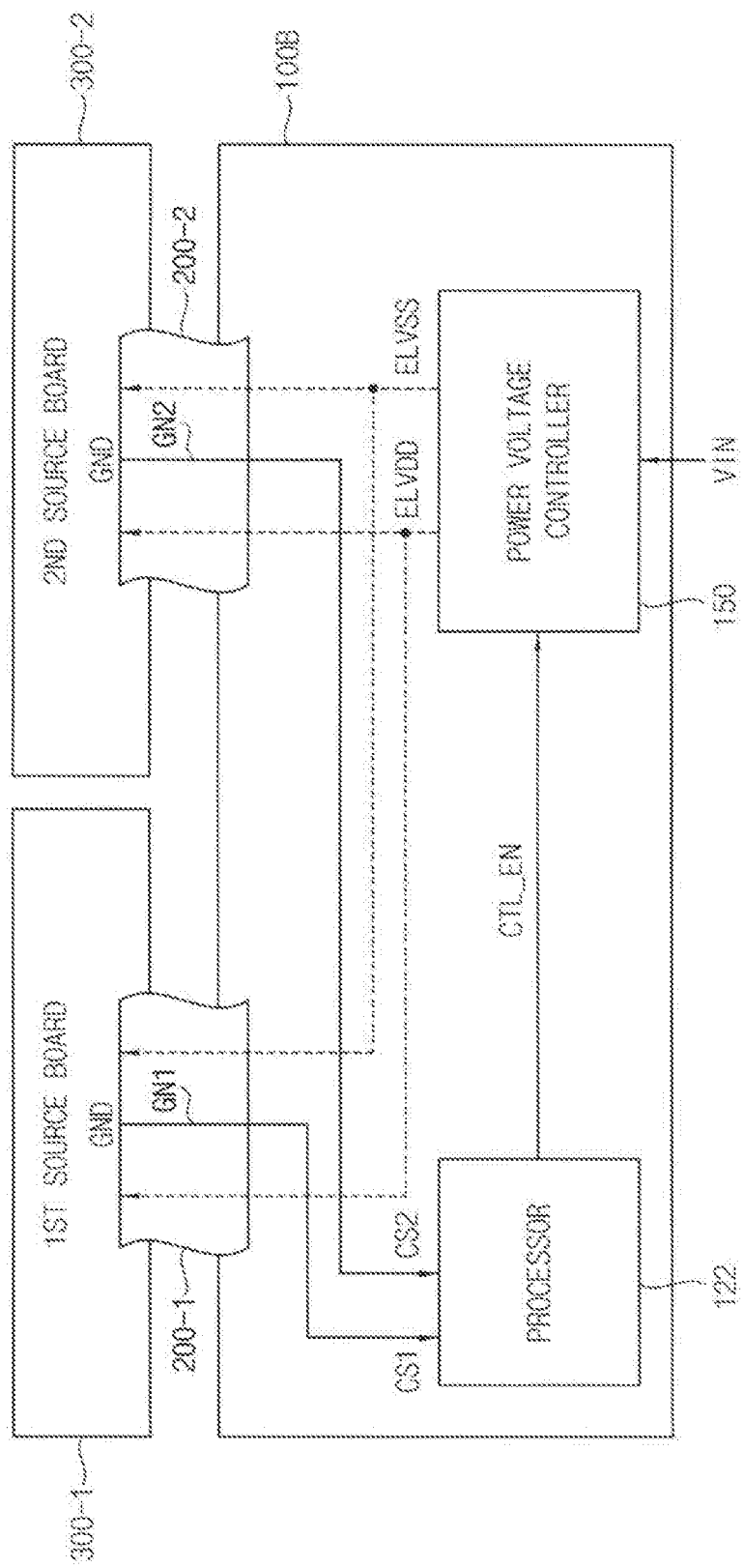
FIG. 9 is a diagram illustrating an example of the source boards and the control board included in the display device of FIG. 1 according to an exemplary embodiment of the inventive concept.

FIG. 9 is a diagram illustrating an example of the source boards and the control board included in the display device of FIG. 1 according to an exemplary embodiment of the inventive concept.

Referring to FIG. 9, the control board 100B may include a processor 122 and a power voltage controller 150.

The processor 122 may receive the first connection signal CS1 from the first ground line GN1 and may receive the second connection signal CS2 from the second ground line GN2. When the first power cable 200-1 is normally connected between the control board 100B and the first source board 300-1, the first connection signal CS1 may correspond to the ground voltage. Similarly, when the second power cable 200-2 is normally connected between the control board 100B and the second source board 300-2, the second connection signal CS2 may correspond to the ground voltage. The processor 122 may generate a first enable signal CTL_EN based on the first connection signal CS1 and the second connection signal CS2. The processor 122 may include, for example, an application processor (AP), a micro control unit (MCU), etc. The processor 122 may generate the first enable signal CTL_EN that is activated (e.g., having the high level) when both of the first connection signal CS1 and the second connection signal CS2 correspond to the ground voltage in a panel driving mode. Alternatively, the processor 122 may generate the first enable signal CTL_EN that is deactivated (e.g., having the low level) when at least one of the first connection signal CS1 and the second connection signal CS2 does not correspond to the ground voltage in the panel driving mode.

The power voltage controller 150 may control the first power voltage ELVDD and the second power voltage ELVSS based on the first enable signal CTL_EN. For convenience of explanation, since the power voltage controller 150 is described in detail above, a further description thereof is herein omitted.

Although the exemplary embodiments described with reference to FIG. 9 describe that the processor 122 generates the first enable signal CTL_EN based on two connection signals CS1 and CS2, exemplary embodiments are not limited thereto. For example, in exemplary embodiments, the processor 122 may generate the first enable signal CTL_EN based on more than two connection signals.

Therefore, exemplary embodiments of the inventive concept provide a display device that does not include an additional circuit (e.g., a dedicated connection detection status circuit) for detecting connection statuses of the power cables. As a result, the manufacturing cost may be reduced because the first enable signal CTL_EN is generated by the processor 122 included in the control board 100B. In addition, when the first enable signal CTL_EN is generated based on more than two connection signals, the power voltage may be controlled according to various connection status conditions. For example, the power voltage may be cut off in a case in which two or more power cables correspond to the abnormal connection status.

Figure 10:
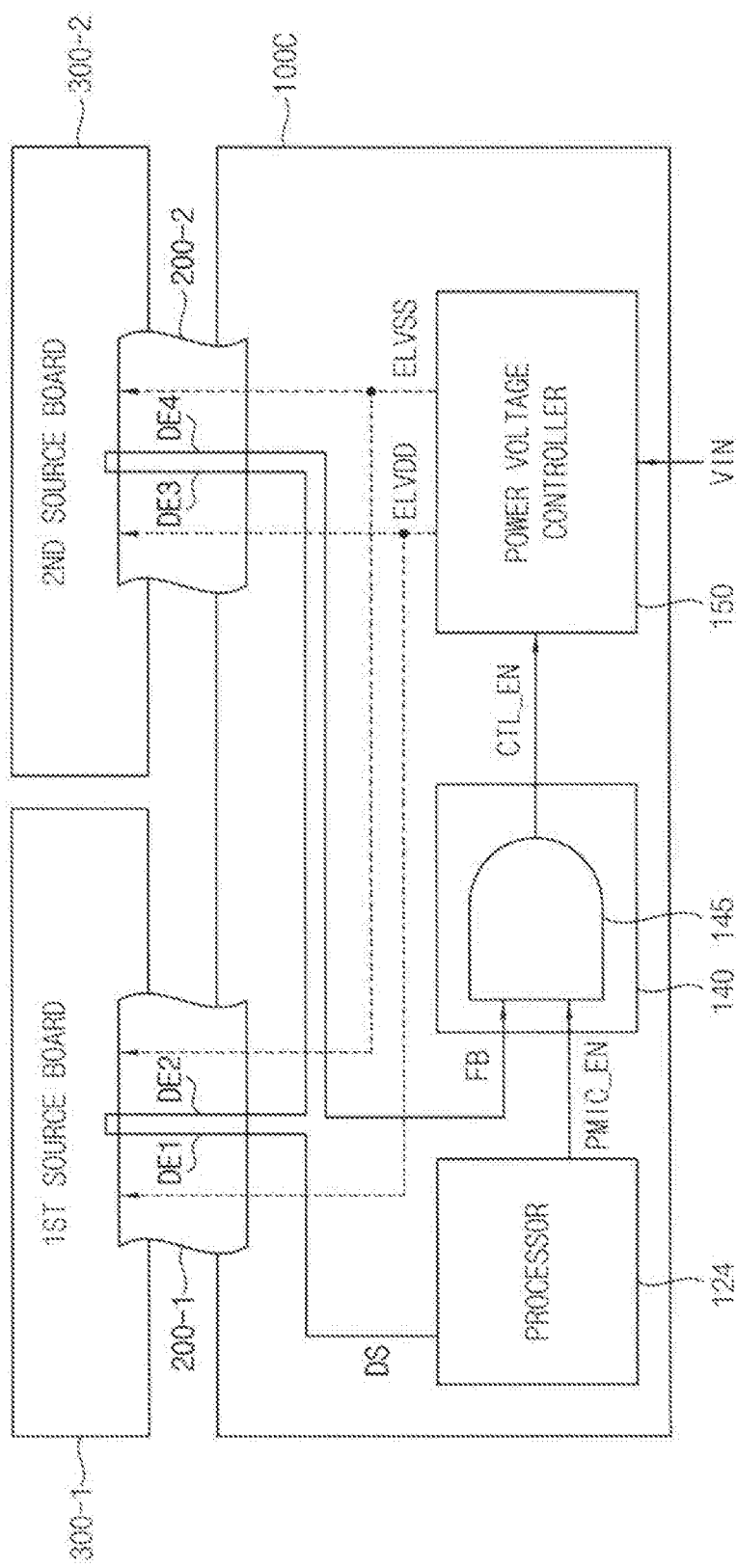
FIG. 10 is a diagram illustrating an example of the source boards and the control board included in the display device of FIG. 1 according to an exemplary embodiment of the inventive concept.

FIG. 10 is a diagram illustrating an example of the source boards and the control board included in the display device of FIG. 1 according to an exemplary embodiment of the inventive concept.

Referring to FIG. 10, the control board 100C may be connected to the first source board 300-1 via a first power cable 200-1 and to the second source board 300-2 via a second power cable 200-2. The first power cable 200-1 may include a first detecting line DE1 and a second detecting line DE2. The second power cable 200-2 may include a third detecting line DE3 and a fourth detecting line DE4. A first terminal of the second detecting line DE2 may be connected to a first terminal of the first detecting line DE1 via the first source board 300-1. A first terminal of the third detecting line DE3 may be connected to a second terminal of the second detecting line DE2 via the control board 100C. A first terminal of the fourth detecting line DE4 may be connected to a second terminal of the third detecting line DE3 via the second source board 300-2.

The control board 100C may include a processor 124, an enable signal generator 140 (also referred to as an enable signal generator circuit 140), and a power voltage controller 150 (also referred to as a power voltage controller circuit 150).

The processor 124 may provide a detecting signal DS to a second terminal of the first detecting line DE1. The processor 124 may include, for example, an AP, an MCU, etc. The enable signal generator 140 may receive a feedback signal FB from a second terminal of the fourth detecting line DE4. Thus, the activated detecting signal DS generated by the processor 124 may be provided to the enable signal generator 140 as the feedback signal FB through the first power cable 200-1, the first source board 300-1, the second power cable 200-2, and the second source board 300-2.

The enable signal generator 140 may generate a first enable signal CTL_EN based on the feedback signal FB. In an exemplary embodiment, the enable signal generator 140 may include an AND gate circuit 145. The AND gate circuit 145 may perform a logical AND operation on the feedback signal FB and a second enable signal PMIC_EN to generate the first enable signal CTL_EN. Here, the second enable signal PMIC_EN may be a signal for enabling or disabling a driving operation of the display panel 500.

The power voltage controller 150 may control the first power voltage ELVDD and the second power voltage ELVSS based on the first enable signal CTL_EN. For convenience of explanation, since the power voltage controller 150 is described in detail above, a further description thereof is herein omitted.

Therefore, exemplary embodiments of the inventive concept provide an efficient structure that allows for connection statuses of power cables to be checked using detecting lines that are electrically connected to one another.

Figure 11:
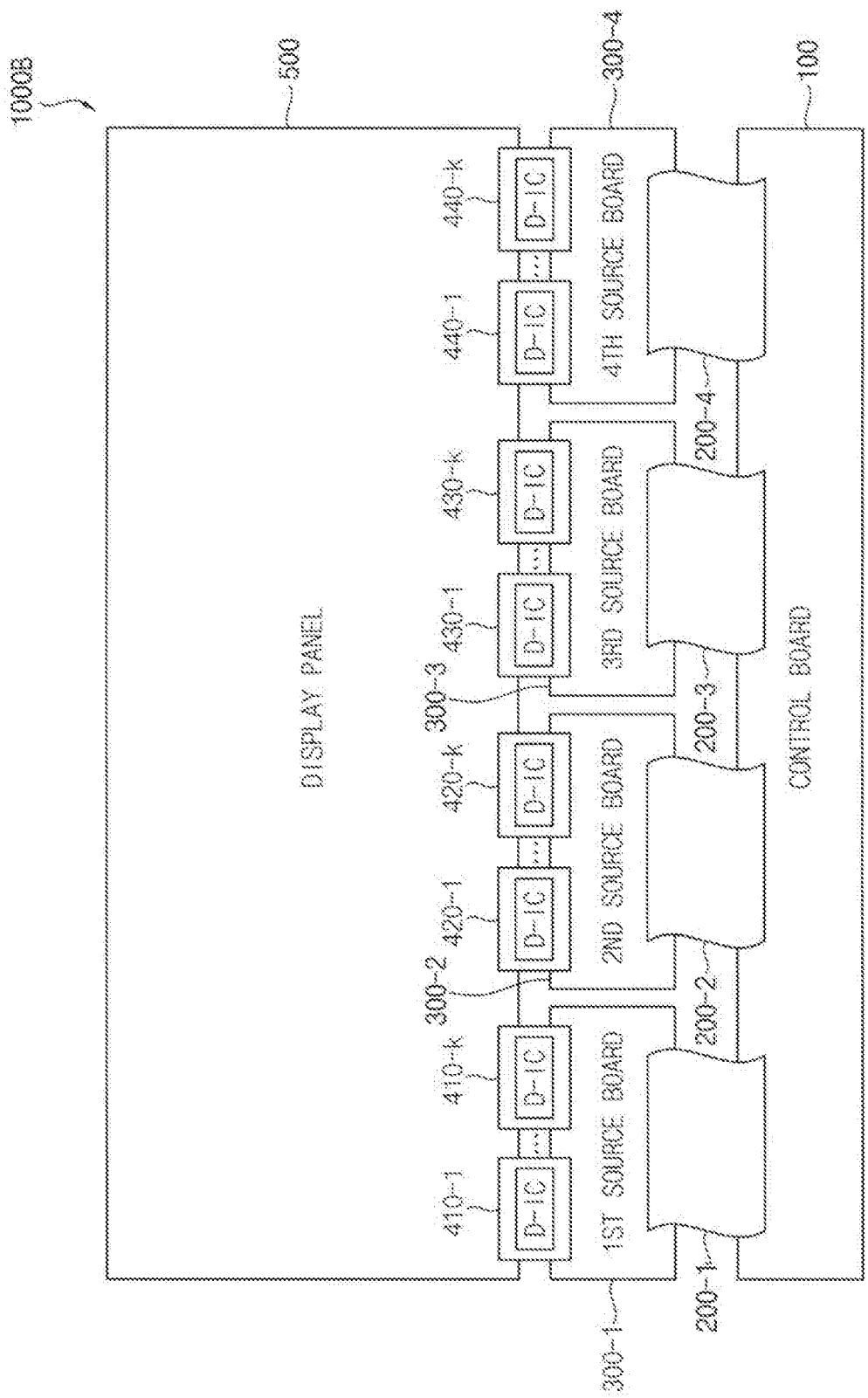
FIG. 11 is a block diagram illustrating a display device according to an exemplary embodiment of the inventive concept.

FIG. 11 is a block diagram illustrating a display device according to an exemplary embodiment of the inventive concept.

Referring to FIG. 11, the display device 1000B may include a control board 100, first through fourth source boards 300-1 through 300-4, and a display panel 500. The display device 1000B according to the present exemplary embodiment is substantially the same as the display device 1000A of the exemplary embodiment described with reference to FIG. 1, except that the display device 1000B includes four source boards (e.g., the third and fourth source boards 300-3 and 300-4 are added). Therefore, for convenience of explanation, the same reference numerals may be used to refer to the same or similar elements as those described with reference to the exemplary embodiment of FIG. 1, and any repetitive explanation thereof may be omitted.

The control board 100 may be respectively connected to the first through fourth source boards 300-1 through 300-4 via first through fourth power cables 200-1 through 200-4. The control board 100 may determine whether the first through fourth power cables 200-1 through 200-4 are in a normal connection status or an abnormal connection status based on the first through fourth connection signals received from the first through fourth ground lines of the first through fourth power cables 200-1 through 200-4. The control board 100 may control the power voltage to prevent or reduce overheating and/or luminance degradation when at least a part of the first through fourth power cables 200-1 through 200-4 are in the abnormal connection status.

The first through fourth source boards 300-1 through 300-4 may be connected to the display panel 500. Here, each of the first through fourth source boards 300-1 through 300-4 may be, for example, a PBA including components for driving the display panel 500 mounted on the PCB.

The display panel 500 may include a plurality of pixels.

According to exemplary embodiments of the inventive concept, the display device may include more than four source boards and corresponding power cables.

Figure 12:
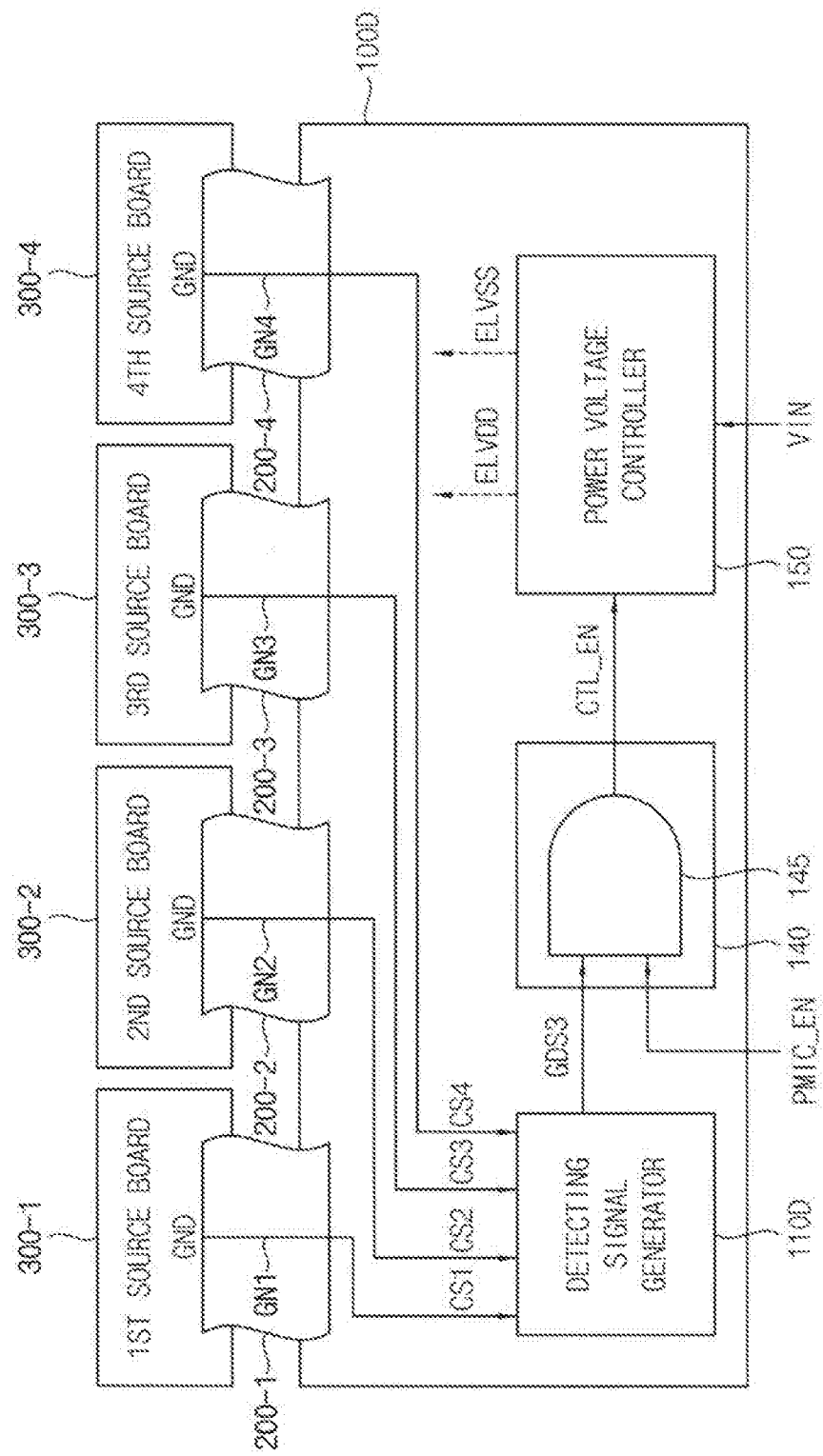
FIG. 12 is a diagram illustrating an example of the source boards and the control board included in the display device of FIG. 11 according to an exemplary embodiment of the inventive concept.

FIG. 12 is a diagram illustrating an example of the source boards and the control board included in the display device of FIG. 11 according to an exemplary embodiment of the inventive concept.

Referring to FIG. 12, the control board 100D may include a detecting signal generator 110D (also referred to as a detecting signal generator circuit 110D), an enable signal generator 140, and a power voltage controller 150.

The detecting signal generator 110D may receive the first connection signal CS1 from the first ground line GN1 of the first power cable 200-1, receive the second connection signal CS2 from the second ground line GN2 of the second power cable 200-2, receive the third connection signal CS3 from the third ground line GN3 of the third power cable 200-3, and receive the fourth connection signal CS4 from the fourth ground line GN4 of the fourth power cable 200-4. When each of the first through fourth power cables 200-1 through 200-4 is normally connected between the control board 100D and each of the first through fourth source boards 300-1 through 300-4, respectively, the first through fourth connection signals CS1 through CS4 may correspond to the ground voltage. The detecting signal generator 110D may generate the detecting signal GDS3 based on the first through fourth connection signals CS1 through CS4. For example, when the first through fourth connection signals CS1 through CS4 correspond to the ground voltage, the detecting signal GDS3 may be activated. Alternatively, when at least one of the first through fourth connection signals CS1 through CS4 does not correspond to the ground voltage, the detecting signal GDS3 may be deactivated.

The enable signal generator 140 may generate a first enable signal CTL_EN based on the detecting signal GDS3. In an exemplary embodiment, the enable signal generator 140 may include an AND gate circuit 145 performing a logical AND operation on the detecting signal GDS3 and a second enable signal PMIC_EN to generate the first enable signal CTL_EN.

The power voltage controller 150 may control the first power voltage ELVDD and the second power voltage ELVSS based on the first enable signal CTL_EN. For convenience of explanation, since the power voltage controller 150 is described in detail above, a further description thereof is herein omitted.

Figure 13:
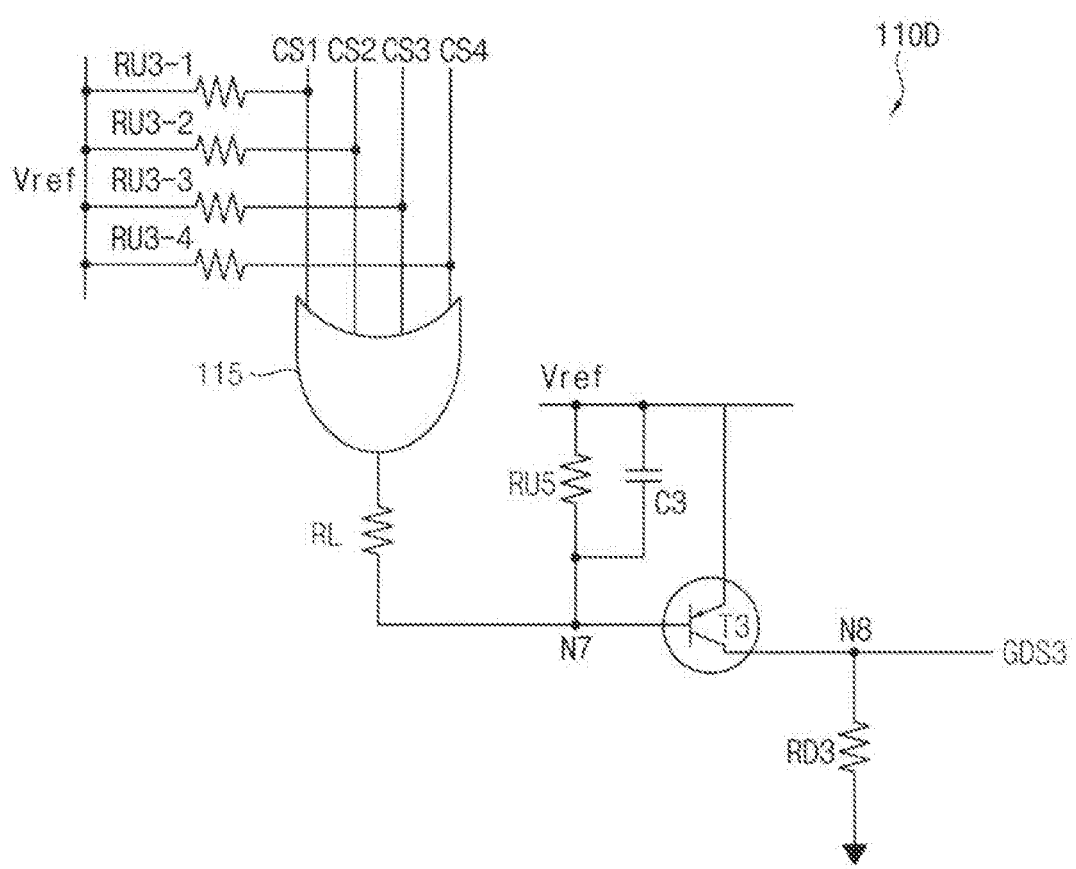
FIG. 13 is a circuit diagram illustrating an example of the detecting signal generator included in the control board of FIG. 12 according to an exemplary embodiment of the inventive concept.

FIG. 13 is a circuit diagram illustrating an example of the detecting signal generator included in the control board of FIG. 12 according to an exemplary embodiment of the inventive concept.

Referring to FIG. 13, the detecting signal generator 110D may include an OR gate circuit 115, a third switching element T3, first through fourth pull-up resistors RU3-1 through RU3-4, a fifth pull-up resistor RU5, a third pull-down resistor RD3, and a third capacitor C3.

The OR gate circuit 115 may receive first through fourth detecting signals CS1 through CS4 and may perform a logical OR operation on the first through fourth connection signals CS1 through CS4. The OR gate circuit 115 may include first through fourth input terminals respectively receiving the first through fourth connection signals CS1 through CS4, and an output terminal.

The third switching element T3 may include a base connected to the seventh node N7, which is connected to the output terminal of the OR gate circuit 115 through resistor RL, an emitter that receives a reference voltage Vref, and a collector connected to an eighth node N8 to which the detecting signal GDS3 is output.

The first through fourth pull-up resistors RU3-1 through RU3-4 may be connected between the reference voltage Vref and the first through fourth input terminals, respectively. The fifth pull-up resistor RU5 may be connected between the seventh node N7 and the reference voltage Vref. The third capacitor C3 may be connected between the seventh node N7 and the reference voltage Vref. The third pull-down resistor RD3 may be connected between the eighth node N8 and the ground voltage. When the first through fourth power cables are in the abnormal connection status, the first through fourth connection signals CS1 through CS4 may be controlled as the high level by the first through fourth pull-up resistors RU3-1 through RU3-4 connected to the reference voltage Vref, and the detecting signal GDS3 may be controlled as the low level by the third pull-down resistor RD3 connected to the ground voltage.

For example, when the first through fourth power cables 200-1 through 200-4 are normally connected between the control board 100D and the first through fourth source boards 300-1 through 300-4 (e.g., in the normal connection status), the first through fourth connection signals CS1 through CS4 may correspond to the ground voltage, and the first through fourth connection signals CS1 through CS4 having the low level may be applied to the OR gate circuit 115. Accordingly, the OR gate circuit 115 may provide the output signal having the low level corresponding to the ground voltage to the base of the third switching element T3. The collector of the third switching element T3 may output the detecting signal GDS3 having the high level.

Alternatively, when the first power cable from among the first through fourth power cables 200-1 through 200-4 is abnormally connected between the control board 100D and the first source board 300-1 (e.g., in the abnormal connection status), the first connection signal CS1 may be controlled as the high level by the first pull-up resistor RU3-1 connected to the reference voltage Vref. The OR gate circuit 115 provides the output signal having the high level to the base of the third switching element T3. Accordingly, because the third switching element T3 is turned off, the detecting signal GDS3 may be controlled as the low level by the third pull-down resistor RD3 connected to the ground voltage.

As described above, the terms "first," "second," "third," etc. are used herein to distinguish one element from another, and the elements are not limited by these terms. Thus, for example, referring to FIG. 13, in an exemplary embodiment, the node that receives the first connection signal CS1 may be referred to as a first node, the node that receives the second connection signal CS2 may be referred to as a second node, the seventh node N7 may be referred to as a third node, the eighth node N8 may be referred to as a fourth node, the pull-up resistor RU3-1 may be referred to as a first pull-up resistor, the pull-up resistor RU3-2 may be referred to, as a second pull-up resistor, and the pull-up resistor RU5 may be referred to as a third pull-up resistor.

Although the exemplary embodiments described with reference to FIG. 13 describe that the detecting signal generator 110D generates the detecting signal GDS3 based on four connection signals CS1 through CS4, exemplary embodiments of the inventive concept are not limited thereto. For example, in exemplary embodiments, the detecting signal generator 110D may generate the detecting signal DDS3 based on one to three connection signals or five or more connection signals.

Therefore, according to exemplary embodiments, in a case in which connection statuses of the power cables are checked using a number of detecting lines, the circuit for checking the connection status may be efficiently implemented with an OR gate circuit.

Figure 14:
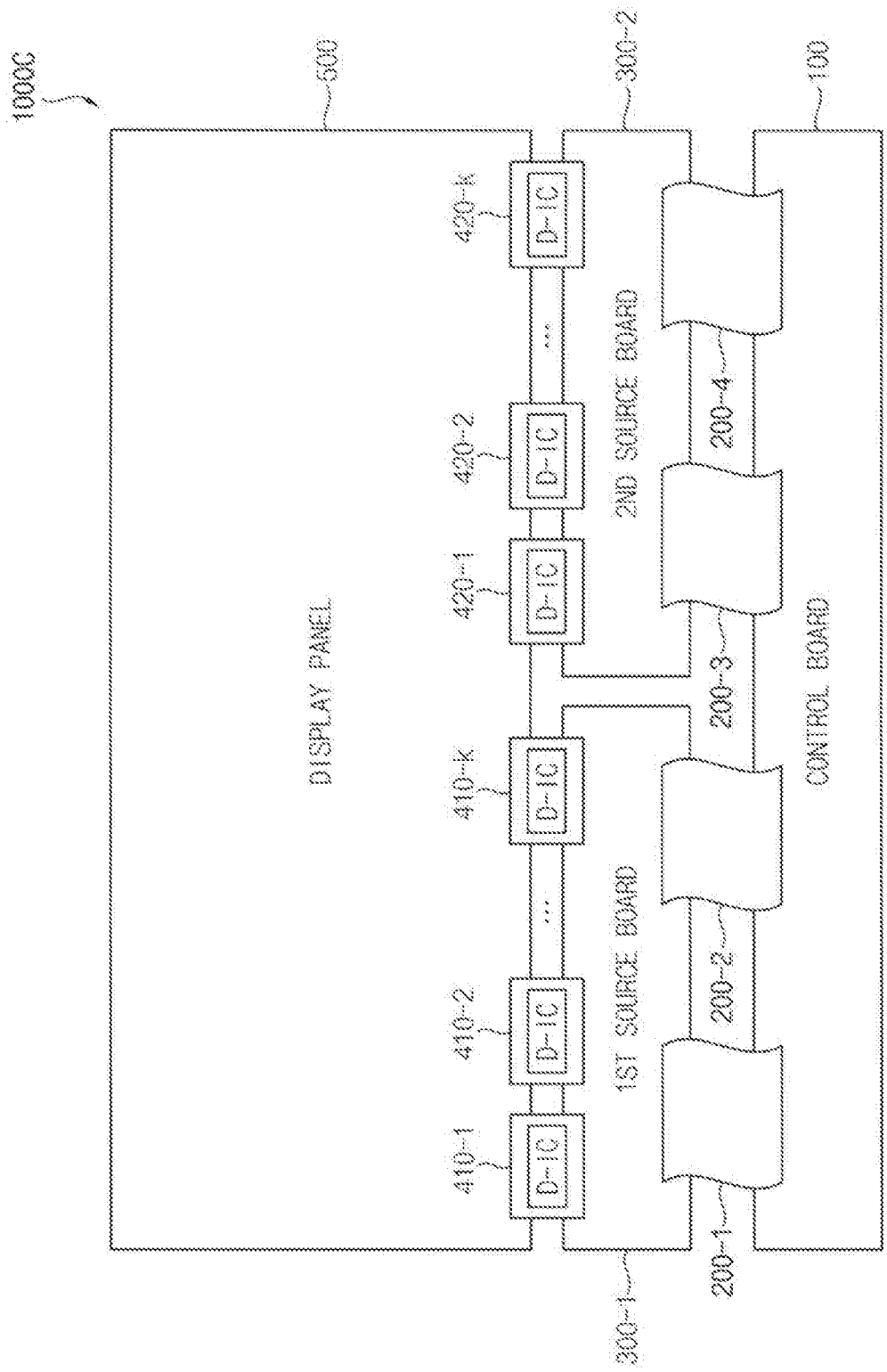
FIG. 14 is a block diagram illustrating a display device according to an exemplary embodiment of the inventive concept.

FIG. 14 is a block diagram illustrating a display device according to an exemplary embodiment of the inventive concept.

Referring to FIG. 14, the display device 1000C may include a control board 100, first and second source boards 300-1 and 300-2, and a display panel 500. The display device 1000C according to the present exemplary embodiment is substantially the same as the display device 1000A of the exemplary embodiment described with reference to FIG. 1, except that each source board 300-1 and 300-2 is connected to the control board 100 via two power cables. For convenience of explanation, the same reference numerals may be used to refer to the same or like elements as those described in the exemplary embodiment of FIG. 1, and a further description of such elements is herein omitted.

The control board 100 may be connected to the first source board 300-1 via first and second power cables 200-1 and 200-2 and connected to the second source board 300-2 via third and fourth power cables 200-3 and 200-4. The control board 100 may determine whether the first through fourth power cables 200-1 through 200-4 are in a normal connection status or an abnormal connection status based on the first through fourth connection signals received from the first through fourth ground lines of the first through fourth power cables 200-1 through 200-4. The control board 100 may control the power voltage to prevent or reduce overheating and/or luminance degradation when at least one of the first through fourth power cables 200-1 through 200-4 is in the abnormal connection status. In an exemplary embodiment, the control board 100 may include a detecting signal generator, an enable signal generator, and a power voltage controller that are substantially the same as those in the control board 100D of FIG. 12.

Figure 15:
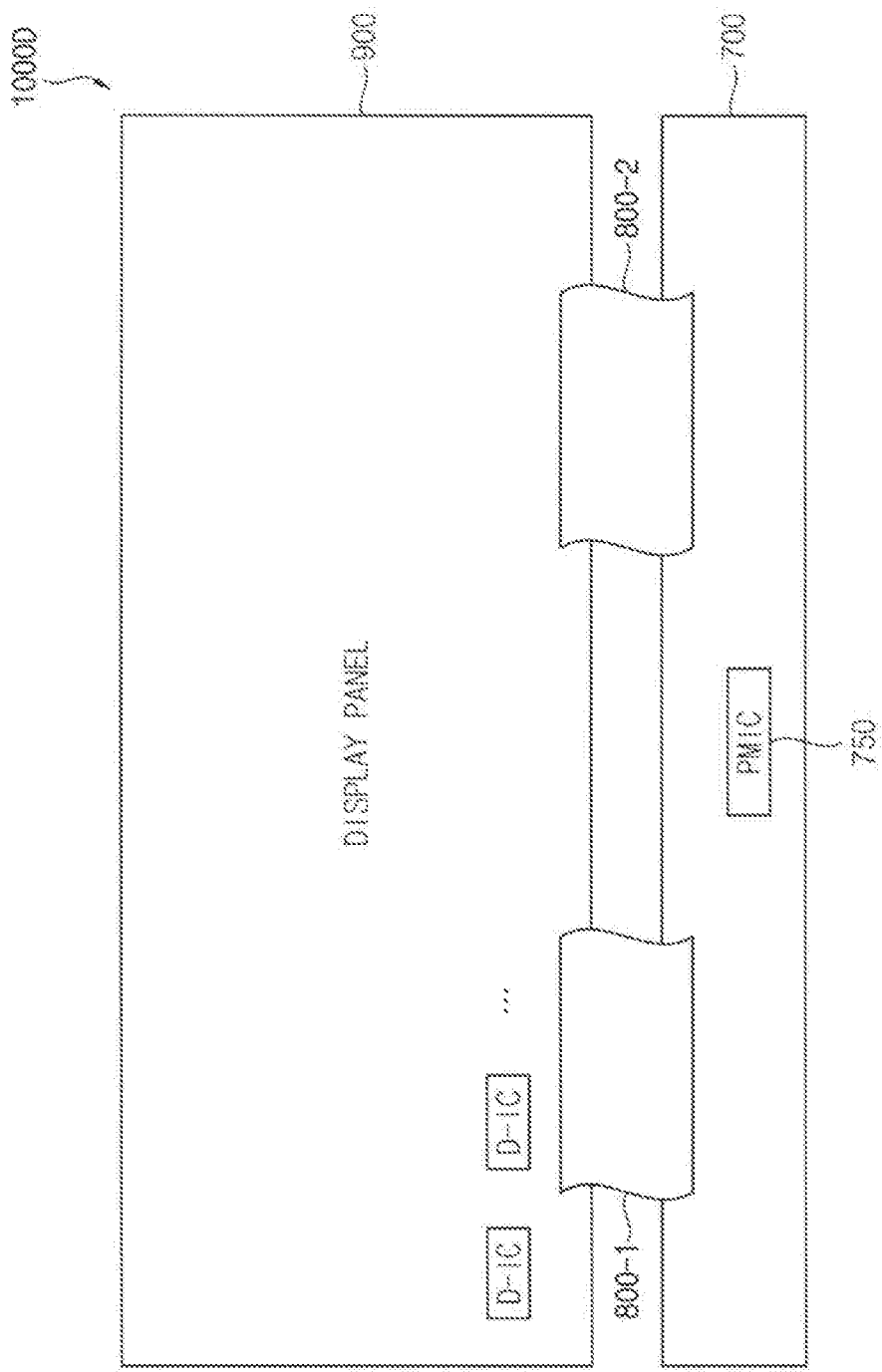
FIG. 15 is a block diagram illustrating a display device according to an exemplary embodiment of the inventive concept.

FIG. 15 is a block diagram illustrating a display device according to an exemplary embodiment of the inventive concept.

Referring to FIG. 15, the display device 1000D may include a control board 700 and a display panel 900.

The control board 700 may be connected to the display panel 900 via first and second power cables 800-1 and 800-2. The control board 700 may include a power management circuit 750 that provides a power voltage to pixels. The power management circuit 750 may determine whether the first power cable 800-1 and the second power cable 800-2 are in a normal connection status or an abnormal connection status based on a first connection signal received from a first ground line of the first power cable 800-1 and a second connection signal received from a second ground line of the second power cable 800-2. The power management circuit 750 may control the power voltage to prevent or reduce overheating and/or luminance degradation when at least one of the first and second power cables 800-1 and 800-2 is in the abnormal connection status. Although FIG. 15 illustrates two power cables 800-1 and 800-2, exemplary embodiments are not limited thereto. For example, exemplary embodiments may include first through (N)th power cables respectively including first through (N)th ground lines that respectively receive first through (N)th connection signals, in which N is an integer greater than one.

In an exemplary embodiment, the power management circuit 750 may include a detecting signal generator that generates a detecting signal based on the first and second connection signals, an enable signal generator that generates a first enable signal based on the detecting signal, and a power voltage controller that controls the power voltage based on the first enable signal. The detecting signal generator, the enable signal generator, and the power voltage controller of the power management circuit 750 may be substantially the same as the detecting signal generator, the enable signal generator, and the power voltage controller described with reference to FIG. 2.

The display panel 900 may include a plurality of pixels. D-IC chips that provide driving signals to the pixels may be mounted on the display panel 900. The D-IC chips may be mounted, for example, in a chip on glass (COG) manner.

Although the exemplary embodiments described with reference to FIG. 15 describe that the control board 700 is connected to the display panel 900 through two power cables 800-1 and 800-2, exemplary embodiments are not limited thereto. For example, in exemplary embodiments, the control board 700 may be connected to the display panel through more than two power cables.

Although the exemplary embodiments described herein describe that the display device is an organic light emitting display device, exemplary embodiments of the inventive concept are not limited thereto. For example, exemplary embodiments of the inventive concept may utilize various types of display devices.

Exemplary embodiments of the inventive concept may be applied to various types of electronic devices that include a display device. For example, exemplary embodiments of the inventive concept may be applied to a cellular phone, a smartphone, a tablet computer, a personal digital assistant (PDA), etc.

As is traditional in the field of the inventive concept, exemplary embodiments are described, and illustrated in the drawings, in terms of functional blocks, components, units and/or modules. Those skilled in the art will appreciate that these blocks, components, units and/or modules are physically implemented by electronic (or optical) circuits such as logic circuits, discrete components, microprocessors, hardwired circuits, memory elements, wiring connections, etc., which may be formed using semiconductor-based fabrication techniques or other manufacturing technologies. In the case of the blocks, components, units and/or modules being implemented by microprocessors or similar, they may be programmed using software (e.g., microcode) to perform various functions discussed herein and may optionally be driven by firmware and/or software. Alternatively, each block, component, unit and/or module may be implemented by dedicated hardware, or as a combination of dedicated hardware to perform some functions and a processor (e.g., one or more programmed microprocessors and associated circuitry) to perform other functions. Also, each block, component, unit and/or module of the exemplary embodiments may be physically separated into two or more interacting and discrete blocks, components, units and/or modules without departing from the scope of the inventive concept. Further, the blocks, components, units and/or modules of the exemplary embodiments may be physically combined into more complex blocks, components, units and/or modules without departing from the scope of the inventive concept.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A display device, comprising:
a display panel comprising a plurality of pixels;
a first source board and a second source board connected to the display panel; and
a control board connected to the first source board via a first power cable and connected to the second source board via a second power cable,
wherein the control board is configured to control a power voltage provided to the pixels based on a first connection signal received from a first ground line of the first power cable and a second connection signal received from a second ground line of the second power cable,
wherein the first connection signal is equal to a ground voltage received through the first ground line when the first power cable is normally connected between the control board and the first source board,
wherein the control board comprises a detecting signal generator configured to receive the first connection signal from the first ground line and the second connection signal from the second round line, and generate a detecting signal based on the first connection signal and the second connection signal,
wherein the detecting signal generator comprises:
a first switching element comprising a base connected to a first node that receives the first connection signal, an emitter that receives a reference voltage, and a collector connected to a second node to which a first detecting signal is output as the detecting signal; and
a second switching element comprising a base connected to a third node that receives the second connection signal, an emitter that receives the reference voltage, and a collector connected to a fourth node to which a second detecting signal is output as the detecting signal.

2. The display device of claim 1, wherein the first ground line receives the ground voltage via the first source board and the second ground line receives the ground voltage via the second source board.

3. The display device of claim 1, wherein the control board further comprises:
an enable signal generator configured to generate a first enable signal based on the detecting signal; and a power voltage controller configured to control the power voltage based on the first enable signal.

4. The display device of claim 3, wherein the enable signal generator comprises:
an AND gate circuit configured to generate the first enable signal by performing a logical AND operation on the first detecting signal, the second detecting signal, and a second enable signal.

5. The display device of claim 3, wherein the power voltage controller comprises:
a switching controller configured to generate a selection signal based on the first enable signal;
a DC-DC converter configured to generate a plurality of converted voltages based on an input voltage; and
a power voltage selector configured to output the power voltage by selecting at least one of the converted voltages based on the selection signal.

6. The display device of claim 5, wherein the switching controller generates the selection signal such that the power voltage is not output when the first enable signal is deactivated.

7. The display device of claim 5, wherein the power voltage selector comprises:
a first selector circuit configured to select a first power voltage applied to an anode electrode of an organic light emitting diode (OLED) included in each of the pixels from among the converted voltages based on the selection signal; and
a second selector circuit configured to select a second power voltage applied to a cathode electrode of the OLED from among the converted voltages based on the selection signal.

8. The display device of claim 7, wherein the switching controller generates the selection signal such that the second power voltage is greater than the first power voltage when the first enable signal is deactivated.

9. The display device of claim 7,
wherein the pixels are driven using simultaneous emission driving, and a single frame is divided into an emission period and a non-emission period, and
wherein the switching controller generates the selection signal such that the first power voltage is greater than the second power voltage during the emission period, and the second power voltage is greater than the first power voltage during the non-emission period when the first enable signal is activated.

10. The display device of claim 1, wherein the detecting signal generator further comprises:
a first pull-up resistor connected between the first node and the reference voltage;
a second pull-up resistor connected between the third node and the reference voltage;
a first pull-down resistor connected between the second node and a ground terminal; and
a second pull-down resistor connected between the fourth node and the ground terminal.

11. The display device of claim 1, wherein the control board comprises:
a processor configured to receive the first connection signal from the first ground line and the second connection signal from the second ground line, and generate a first enable signal based on the first connection signal and the second connection signal; and
a power voltage controller configured to control the power voltage based on the first enable signal.

12. A display device, comprising:
a display panel comprising a plurality of pixels;
a first source board and a second source board connected to the display panel; and
a control board connected to the first source board via a first power cable and connected to the second source board via a second power cable,
wherein the control board is configured to control a power voltage, provided to the pixels based on a first connection signal received from a first ground line of the first power cable and a second connection signal received from a second ground line of the second power cable,
wherein the first connection signal is equal to a ground voltage received through the first ground line when the first power cable is normally connected between the control board and the first source board,
wherein the control board comprises:
a detecting signal generator configured to receive the first connection signal from the first ground line and the second connection signal from the second ground line, and generate a detecting signal based on the first connection signal and the second connection signal,
wherein the detecting signal generator comprises:
an OR gate circuit comprising a first input terminal connected to a first node that receives the first connection signal, a second input terminal connected to a second node that receives the second connection signal, and an output terminal;
a switching element comprising a base connected to a third node that is connected to the output terminal of the OR gate circuit, an emitter that receives a reference voltage, and a collector connected to a fourth node to which the detecting signal is output;
a first pull-up resistor connected between the first node and the reference voltage;
a second pull-up resistor connected between the second node and the reference voltage;
a third pull-up resistor connected between the third node and the reference voltage; and
a pull-down resistor connected between the fourth node and a ground terminal.

13. The display device of claim 12, wherein the control board further comprises:
an enable signal generator configured to generate a first enable signal based on the detecting signal; and
a power voltage controller configured to control the power voltage based on the first enable signal.

14. The display device of claim 13, wherein the enable signal generator comprises:
an AND gate circuit configured to generate the first enable signal by performing a logical AND operation on the detecting signal and a second enable signal.

15. A display device, comprising:
a display panel comprising a plurality of pixels; and
a power management circuit configured to provide a power voltage to the pixels via first through (N)th power cables,
wherein the first through (N)th power cables respectively comprise first through (N)th ground lines, and the power management circuit is configured to control the power voltage based on first through (N)th connection signals respectively received from the first through (N)th ground lines, wherein N is an integer greater than 1,
wherein each of the first through (N)th connection signals is equal to a ground voltage received through the first through (N)th ground lines when the first through (N)th power cables are normally connected between the power management circuit and the display panel, wherein the power management circuit controls the power voltage to operate the pixels when each of the first through (N)th connection signals is equal to the ground voltage, and the power management circuit controls the power voltage such that the pixels are not operated when each of the first through (N)th connection signals is not equal to the ground voltage, wherein the first through (N)th connection signals are respectively received through only one pin of each of the first through (N)th power cables, and the power management circuit detects whether each of the first through (N)th power cables is abnormally connected between the power management circuit and the display panel using the only one pin of each of the first through (N)th power cables.

16. The display device of claim 15, wherein the power management circuit comprises:
a detecting signal generator configured to generate a detecting signal based on the first through (N)th connection signals;
an enable signal generator configured to generate a first enable signal based on the detecting signal; and
a power voltage controller configured to control the power voltage based on the first enable signal.

17. The display device of claim 16,
wherein the detecting signal generator comprises first through (N)th switching elements, and
wherein a (K)th switching element comprises a base that receives a (K)th connection signal, an emitter that receives a reference voltage, and a collector to which a (K)th detecting signal is output as the detecting signal, wherein K is an integer between 1 and N.

18. The display device of claim 16, wherein the enable signal generator comprises:
an AND gate circuit configured to generate the first enable signal by performing a logical AND operation on first through (N)th detecting signals and a second enable signal.

19. The display device of claim 16, wherein the detecting signal generator comprises:
an OR gate circuit configured to generate an output signal by performing a logical OR operation on the first through (N)th connection signals; and
a detecting signal switching element comprising a base that receives the output signal of the OR gate circuit, an emitter that receives a reference voltage, and a collector to which the detecting signal is output.

20. The display device of claim 19, wherein the enable signal generator comprises:
an AND gate circuit configured to generate the first enable signal by performing a logical AND operation on the detecting signal and a second enable signal.

21. A display device, comprising:
a display panel comprising a plurality of pixels;
a first source board and a second source board connected to the display panel; and
a control board connected to the first source board via a first power cable comprising a first detecting line and a second detecting line, and connected to the second source board via a second power cable comprising a third detecting line and a fourth detecting line,
wherein a first terminal of the second detecting line is connected to a first terminal of the first detecting line via the first source board,
wherein a first terminal of the third detecting line is connected to a second terminal of the second detecting line via the control board,
wherein a first terminal of the fourth detecting line is connected to a second terminal of the third detecting line via the second source board, and
wherein the control board comprises:
a processor configured to provide a detecting signal to a second terminal of the first detecting line;
an enable signal generator configured to receive a feedback signal from a second terminal of the fourth detecting line and to generate a first enable signal based on the feedback signal; and
a power voltage controller configured to control a power voltage based on the first enable signal.

* * * * *